United States Patent
Chance et al.

(10) Patent No.: US 9,407,490 B2
(45) Date of Patent: Aug. 2, 2016

(54) METHOD OF PROCESSING RECEIVED DIGITIZED SIGNALS AND MOBILE RADIO COMMUNICATION TERMINAL DEVICE

(71) Applicant: Intel Corporation, Santa Clara, CA (US)

(72) Inventors: Greg Chance, Mundelein, IL (US); Thorsten Tracht, Munich (DE)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/580,296

(22) Filed: Dec. 23, 2014

(65) Prior Publication Data
US 2016/0182271 A1    Jun. 23, 2016

(51) Int. Cl.
H04L 27/26 (2006.01)
H04L 27/16 (2006.01)
H04W 24/08 (2009.01)

(52) U.S. Cl.
CPC ............ *H04L 27/2672* (2013.01); *H04L 27/16* (2013.01); *H04W 24/08* (2013.01)

(58) Field of Classification Search
CPC ...... H04B 17/20; H04B 17/29; H04B 17/309; H04B 17/318; H04B 17/336; H04B 17/345; H04L 27/0024; H04L 27/06; H04L 27/14; H04L 27/16; H04L 27/22; H04L 27/2271; H04L 27/2276; H04L 27/2647; H04L 27/2649; H04L 27/2653; H04L 27/2672; H04L 27/38; H04L 27/3836; H04W 24/08
USPC ......... 375/285, 316, 324–326, 328, 340, 344, 375/346, 348, 349; 455/501, 62, 63.1, 63.3, 455/67.13, 71, 140, 141, 161.2, 161.3, 455/164.1, 164.2, 165.1, 226.1, 226.2, 455/226.3
See application file for complete search history.

(56) References Cited

U.S. PATENT DOCUMENTS

| 7,330,707 | B2 * | 2/2008 | Okanobu | H04B 1/28 455/133 |
| 2004/0153879 | A1 * | 8/2004 | Fukutani | H04B 1/1027 714/48 |
| 2008/0261548 | A1 * | 10/2008 | Krone | H03D 3/006 455/205 |
| 2010/0297975 | A1 * | 11/2010 | Carrera | H04B 1/0085 455/307 |

FOREIGN PATENT DOCUMENTS

| EP | 1551099 A1 | 7/2005 |
| EP | 1786112 A2 | 5/2007 |
| WO | 2008072171 A1 | 6/2008 |

OTHER PUBLICATIONS

Extended European Search Report received for the corresponding EP Application No. 15195498.9, dated Jun. 2, 2016, 7 pages.

* cited by examiner

*Primary Examiner* — Young T Tse

(57) ABSTRACT

A method of processing signals may include receiving a first signal being modulated on a first carrier frequency in a predefined frequency band; measuring a signal level of a received second signal at a frequency higher than the first carrier frequency; and measuring a signal level of a received third signal at a frequency being lower than the first carrier frequency. The method may further include selecting an intermediate mixing carrier frequency from a plurality of intermediate mixing carrier frequencies for processing at least a portion of the received first signal based on the signal level of the second signal and the signal level of the third signal. The method may additionally include performing intermediate frequency reception of at least a portion of the received first signal using the selected intermediate mixing carrier frequency.

20 Claims, 12 Drawing Sheets

METHOD OF PROCESSING RECEIVED DIGITIZED SIGNALS AND MOBILE RADIO COMMUNICATION TERMINAL DEVICE

TECHNICAL FIELD

Various aspects of this disclosure relate generally to a method for adapting a wireless receiver to signal degradation caused by spurious interference and image frequencies.

BACKGROUND

Modern Radio frequency (RF) receivers used in mobile communications typically utilize either direct conversion or low intermediate frequency (low-IF) reception to receive and demodulate wirelessly received radio signals. These wirelessly received radio signals typically contain a wanted or desired signal that has been modulated onto a predefined carrier frequency. Direct conversion receivers demodulate radio signals by converting a wanted signal directly to baseband frequencies. This may be performed using a local oscillator component in an RF receiver with an oscillation frequency that substantially matches to the carrier frequency.

In contrast, low-IF receivers (also known as superheterodyne receivers) perform an initial conversion to an intermediate frequency. For example, a low-IF receiver may first down-convert a received radio frequency signal to a non-baseband intermediate frequency before performing final demodulation. Low-IF receivers may use a local oscillator with a frequency that is not identical to the carrier frequency, which results in a shift of a wanted signal from a carrier frequency to a non-baseband intermediate frequency.

Low-IF receivers offer greater simplicity due to complications involved with the high frequency circuitry required by direct conversion receivers. However, the performance of all low-IF receivers suffers from the presence of "image frequencies" which are unavoidably introduced into the intermediate frequency signal. Due to the symmetrical nature of the frequency domain, an additional unwanted frequency is also transposed to the intermediate frequency along with the wanted signal. The presence of this unwanted frequency laid overtop of the wanted signal may degrade the integrity of the wanted signal. Accordingly, low-IF receivers are usually further process the IF signal in order to compensate for the negative impacts of image frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Various aspects of this disclosure provide one or more methods to improve robustness of a low intermediate frequency (low-IF) receiver used in mobile communications. A low-IF receiver may actively monitor potential image frequencies in order to identify an image frequency that may minimally impact the integrity of a wanted signal conversion to an intermediate frequency. A low-IF receiver may then utilize an identified minimal impact image frequency to select a local oscillator frequency for use in low-IF reception.

Figure 1:
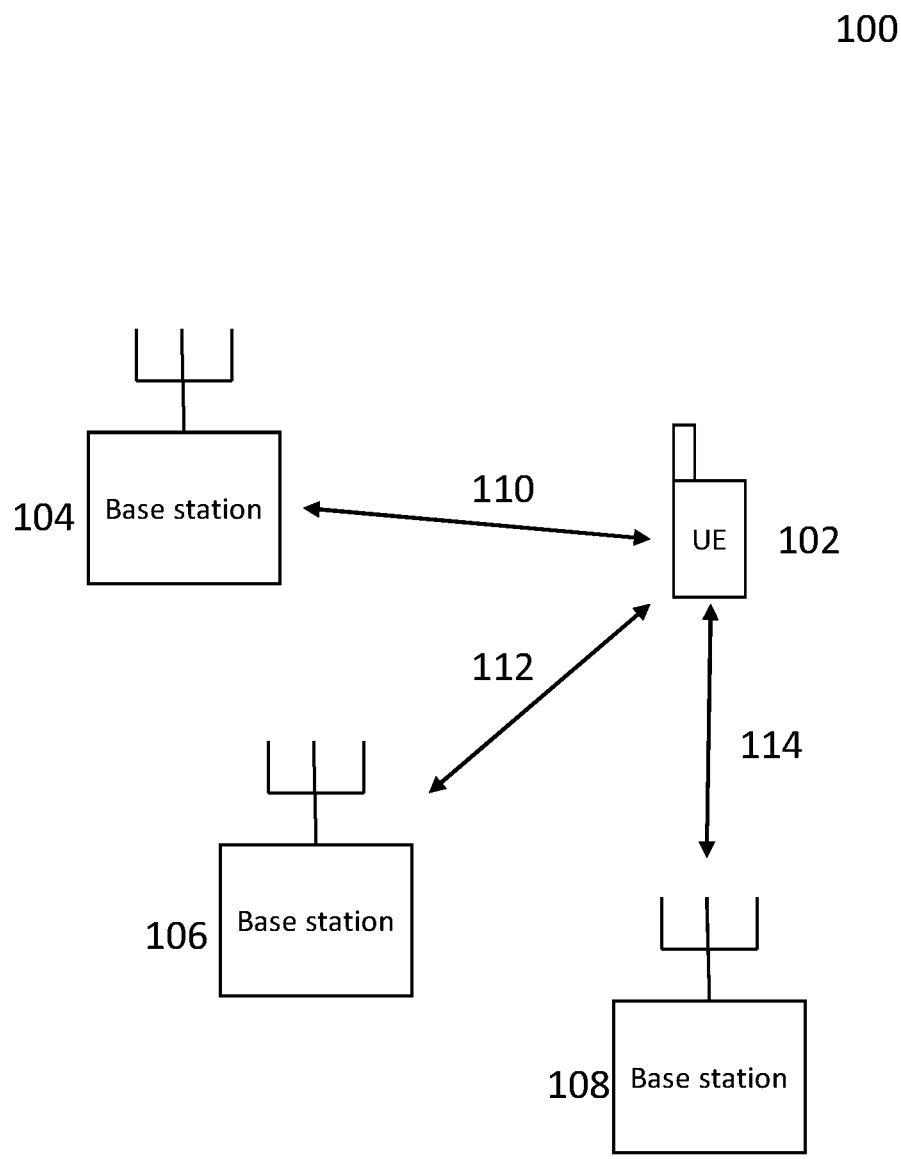
FIG. 1 shows a mobile radio communication system.

FIG. 1 shows a mobile radio communication system 100. Mobile radio communication terminal device 102 such as e.g. User Equipment (UE) 102 may receive a plurality of radio signals from one or more base stations such as e.g. NodeBs or eNodeBs 104, 106, and 108, e.g. via respective air interfaces 110, 112, and 114. It is to be noted that although the further description uses a configuration of the mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP (4th Generation Partnership Project) mobile radio communication system, and the like.

Figure 2:
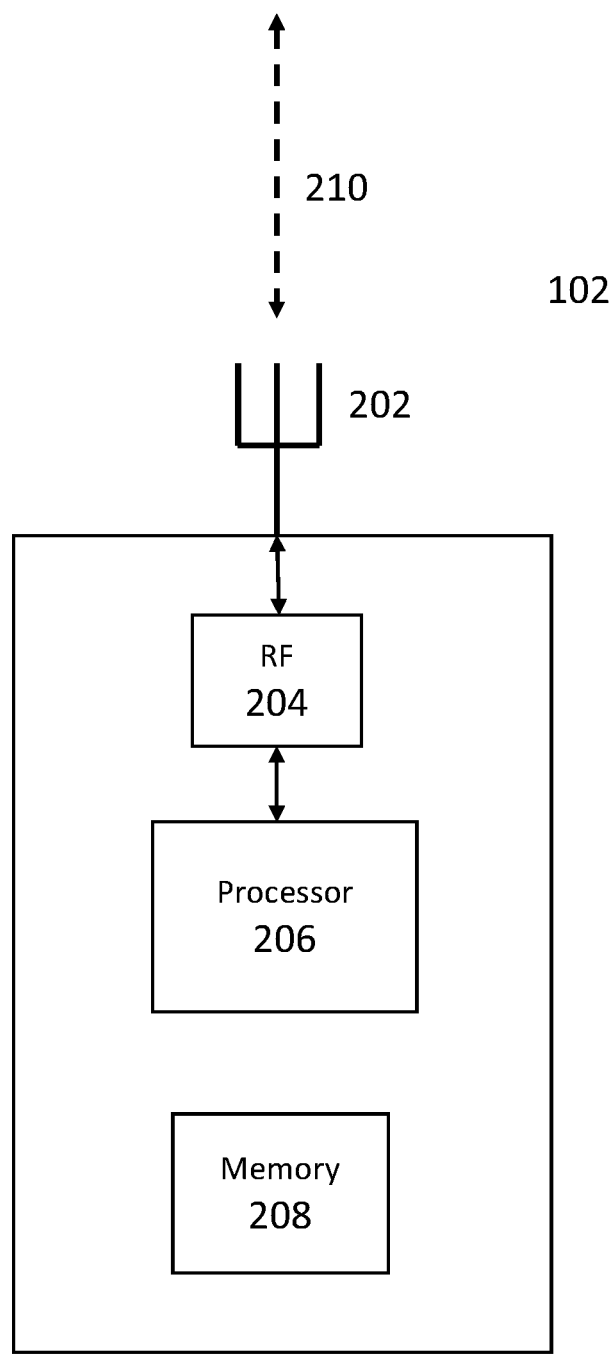
FIG. 2 shows various components and circuits of the UE of FIG. 1.

FIG. 2 shows various components and circuits of UE 102. UE 102 may receive and transmit radio signals over air interface 210 with antenna 202. Antenna 202 may be a single antenna or an antenna array. Antenna 202 may be coupled to RF transceiver 204, which may be configured to process and digitize received radio signals. For example, RF transceiver 204 may demodulate received signals from a carrier frequency to an intermediate or baseband frequency. RF transceiver 204 may then digitize the received signals and supply them to other components and/or circuits of UE 102. RF transceiver 204 may also be configured to modulate and wirelessly transmit radio signals using antenna 202. For example, RF transceiver 204 may be coupled to processor 206. Processor 206 may then supply RF transceiver 204 with a baseband digital signal to be wirelessly transmitted to an external receiver, such as e.g. one of base stations 104-108. RF transceiver 204 may modulate the baseband digital signal onto an analog RF carrier signal and transmit the resulting radio signal with antenna 202 over air interface 210.

As detailed above, RF transceiver 204 may provide received radio signals to other components of UE 102 in digital form. For example, RF transceiver 204 may provide digitized signals to processor 206 for further processing. Processor 206 may process the digitized signals, such as e.g. processing data frames or voice signals intended for UE 102. RF transceiver 204 may also be coupled to memory 208 (not shown in FIG. 2) and provide digitized signals obtained from received radio signals to memory 208. Memory 208 may accordingly store digitized signals for later use by various components and/or circuits of UE 102. Memory 208 may be any of a variety of memory types, such as volatile (RAM, DRAM, SRAM, etc.) or non-volatile (ROM, hard drive, optical drive, etc.). Memory 208 may also be implemented as a wideband data buffer. Although not shown in FIG. 2, memory 208 may be connected to any number of the components of UE 102 in order to provide data storage, such as to e.g. RF transceiver 204 or processor 206. Alternatively, memory 208 may be decentralized and accordingly separated into multiple dedicated memory storage units.

Processor 206 may organize and support mobile communications between UE 102 and a transmitting base station. For example, processor 206 may process digitized signals from RF transceiver 204 to process data frames and/or voice signals intended for UE 102. These data frames and/or voice signals may be provided to a user, such as e.g. to support an ongoing voice call or data session. Alternatively, processor 206 may process control signals supplied from e.g. one of base stations 104-108. Control signals may be utilized by UE 102 to facilitate mobile management operations such as e.g. handovers.

Processor 206 may additionally coordinate the transmission of outgoing data frames and/or voice signals, such as e.g. by supplying data frames or voice signals to RF transceiver 204 to be wirelessly transmitted. Processor 206 may additionally organize the wireless transmission of control signals to a serving base station.

Processor 206 may also perform various wireless quality measurements. For example, processor 206 may perform a signal power or signal quality measurement of a received radio signal in order to analyze the quality of an active communication link. Due to the largely time-variant nature of wireless communication channels, UE 102 may be configured to periodically perform such evaluations in order to maintain an updated characterization of wireless channel quality.

For example, UE 102 may have an active ongoing data session with base station 104 over air interface 110 as shown in FIG. 1. UE 102 may perform periodic evaluations of the channel quality of air interface 110, such as e.g. performing a signal power or signal quality measurement. Exemplary signal power or signal quality measurements may be one of a received signal strength indicator (RSSI), received signal receive power (RSRP), a received signal receive quality (RSRQ), received synchronization signal power (RSSP), received primary synchronization signal power (RPSSP), received secondary synchronization signal power (RSSSP), signal to noise ratio (SNR), SNR estimate of a received primary synchronization signal (PSS), SNR estimate of a received secondary synchronization signal (SSS), SNR estimate of a channel estimate obtained from a PSS and/or SSS, SNR estimate of a timing/frequency estimate, SNR estimate of a common reference signal (CRS), SNR estimate of a channel estimate obtained from a CRS, or a SNR estimate of CRS-based timing/frequency estimate.

UE 102 may accordingly perform a signal power or signal quality measurement based on a radio signal received over air interface 110. For example, processor 206 may process a digitized signal received by RF transceiver 204 over antenna 202 to calculate a signal power or signal quality measurement. UE 102 may report calculated signal power or signal quality measurements to base station 104 to facilitate various mobile communication processes, such as e.g. adjusting wireless transmission/reception in response to varying channel conditions or various mobility management operations.

Figure 3A:
FIGS. 3A-3D show various frequency domain plots of wireless signal reception.

FIG. 3A illustrates an exemplary wireless signal that may be received by UE 102 using antenna 202. FIG. 3A shows a frequency domain plot of a wirelessly transmitted wanted signal X(f) that has been modulated at a carrier frequency $f_c$. X(f) is centered at carrier frequency $f_c$ on frequency axis 300 as it has been modulated onto a carrier signal having center frequency $f_c$.

Conventional receivers may implement either direct conversion or low-IF reception to demodulate wanted signal X(f). In other words, either direct conversion or low-IF conversion may be used in order to transpose wanted signal X(f) from carrier frequency $f_c$ to baseband frequencies for further processing. Low-IF reception first modulates a wanted signal X(f) to a non-baseband, intermediate frequency before performing further conversion to baseband. Direct conversion directly transposes a wanted signal such as X(f) from a carrier frequency $f_c$ to baseband.

A receiver performing direct conversion may select a local oscillator frequency $f_{LO}$ equal to the modulating carrier frequency $f_c$, i.e. $f_{LO}=f_c$. Accordingly, this operation will shift wanted signal X(f) from a carrier frequency $f_c$ to 0 Hz. Wanted signal X(f) will consequently be at baseband frequencies after this mixing.

In contrast, a receiver performing low-IF reception may select a local oscillator frequency $f_{LO} \neq f_c$. Accordingly, wanted signal x will be shifted to a non-baseband intermediate frequency $f_{IF}=|f_c-f_{LO}|$.

Figure 3B:
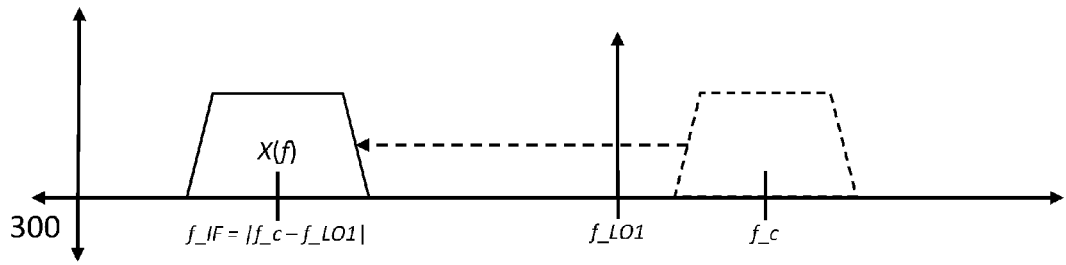

FIG. 3B illustrates an exemplary low-IF mixing operation. Wanted signal X(f) may be mixed using a local oscillator frequency $f_{LO1}$. Accordingly, X(f) may be transposed in the frequency domain to intermediate frequency $f_{IF}=|f_c-f_{LO1}|$. Further demodulation and reception processing may accordingly be performed on X(f) centered at $f_{LO1}$.

Due to the symmetrical nature of the frequency axis, a different local oscillator frequency $f_{LO2}$ may also be selected that transposes X(f) to the same intermediate frequency $f_{IF}$. For example, selecting $f_{LO2}=f_{LO1}+2*f_{IF}$ will also shift X(f) to the same intermediate frequency $f_{IF}$. An exemplary illustration is shown in FIG. 3C.

Figure 3C:
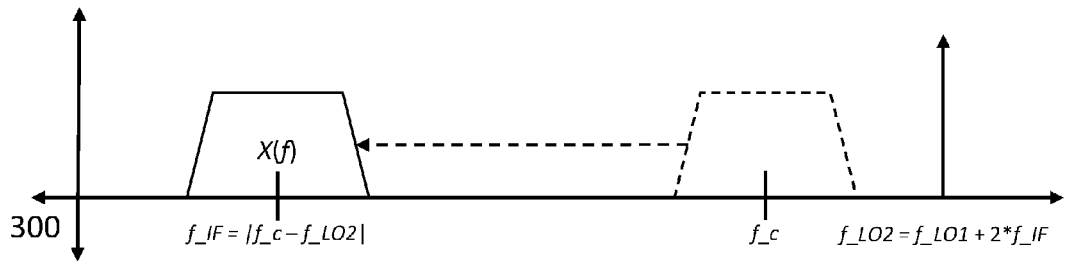
Figure 3D:
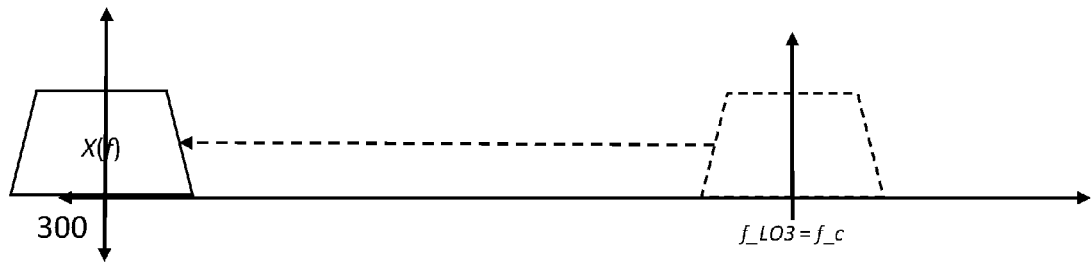

FIG. 3D shows an example of direct conversion. A direct conversion receiver may select a local oscillator frequency $f_{LO3}=f_c$, i.e. the local oscillator frequency may be selected to match carrier frequency $f_c$. X(f) may accordingly be mixed directly to baseband from carrier frequency $f_c$, i.e. directly converted, by selecting a local oscillator frequency $f_{LO3}=f_c$.

There may exist scenarios where low-IF reception as shown in FIGS. 3B-3C may be preferred over direction conversion as shown in FIG. 3D. For example, certain RF receivers may suffer from spurious interference. Spurious interference may generate highly concentrated "spurs" centered at a given frequency. These spurs may be caused by non-linear internal receiver components such as a mixer or local oscillator driver.

Figure 4:
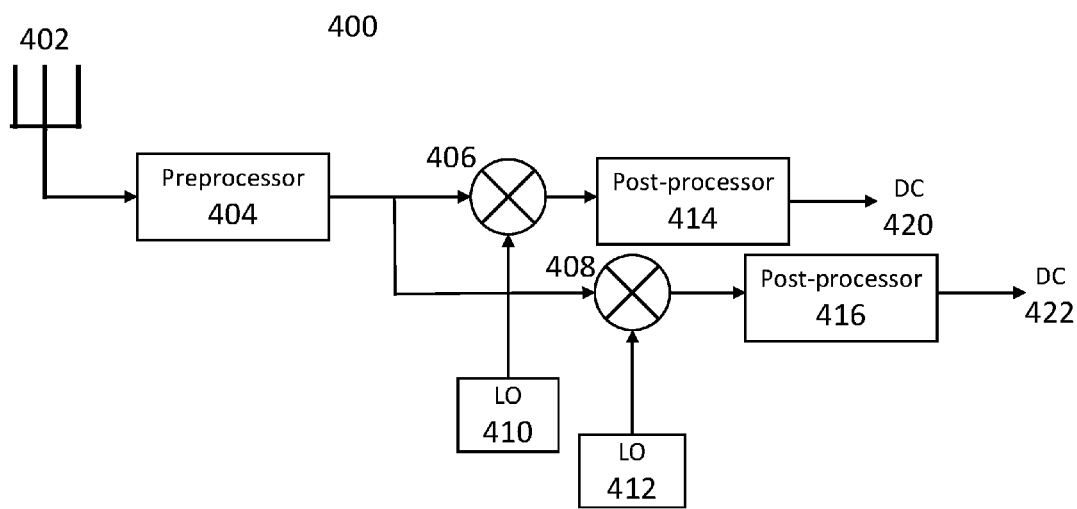
FIG. 4 shows a wireless receiver susceptible to spurious interference.

For example, a receiver using a mixer or local oscillator driver may inadvertently introduce spurious interference to an output signal. FIG. 4 shows a receiver 400 that may be configured to receive radio signals over multiple carrier frequencies, such as e.g. two LTE carriers. Receiver 400 may accordingly be an LTE receiver that is configured to perform carrier aggregation over multiple carrier frequencies. Receiver 400 may wirelessly receive a wideband radio signal using antenna 402. This wideband radio signal may contain two wanted signals $x_1$ and $x_2$, where $x_1$ has been modulated onto a first carrier signal having center frequency $f_{c1}$ and $x_2$ has been modulated onto a second carrier signal having center frequency $f_{c2}$. Receiver 400 may consequently be configured to demodulate each of wanted signals $x_1$ and $x_2$ using a single transposition to baseband frequencies, i.e. using direct conversion.

Preprocessor 404 may perform initial processing on a received signal, such as e.g. amplification, noise reduction, and/or other filtering operations, and supply the received signal to mixers 406 and 408. Each mixer 406 and 408 may be configured to mix a received input signal with a local oscillation frequency supplied by local oscillators 410 and 412, respectively. Each mixer may be implemented as one or more circuits or dedicated processors. Receiver 400 may be configured to implement direct conversion, in which case local oscillator 410 may provide a first mixing frequency $f_{m1}=f_{c1}$, where $f_{c1}$ is the carrier frequency of first carrier channel that receiver 400 is configured to receive. Similarly, local oscillator 412 may provide a second mixing frequency $f_{m2}=f_{c2}$ where $f_{c2}$ is the carrier frequency of a second carrier channel that receiver 400 is configured to receive. Mixer 406 may mix the preprocessed received signal with the mixing frequency $f_{m1}$ matching first carrier frequency $f_{c1}$, thereby transposing wanted signal $x_1$ to baseband from first carrier frequency $f_{c1}$. Similarly, mixer 408 may mix the preprocessed received signal with the mixing frequency $f_{m2}$ matching second carrier frequency $f_{c2}$, thereby transposing wanted signal $x_2$ to baseband from second carrier frequency $f_{c2}$.

The output of mixers 406 and 408 may correspond to wanted signals $x_1$ and $x_2$ at baseband, respectively. These obtained signals may then be post-processed by post-processors 414 and 416, which may e.g. perform further amplification and/or filtering operations. Receiver 400 may finally output direct conversion signals 420 and 422, which may be processed versions of wanted signals $x_1$ and $x_2$.

However, spurious interference may be present in direct conversion output signals 420 and 422. As previously detailed, internal components such as mixers or local oscillators drivers may inadvertently introduce frequency spurs into the receive signal path. For example, spurious interference may be introduced by local oscillators 410 and 412, and accordingly wanted signals $x_1$ or $x_2$ may be corrupted by an interference spur in output signals 420 and 422.

Figure 5:
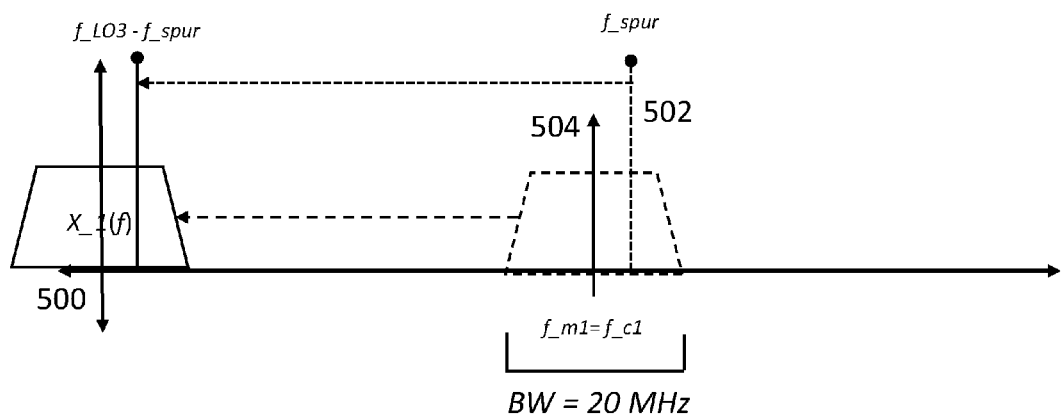
FIG. 5 shows a frequency domain plot of spurious interference.

FIG. 5 shows an exemplary scenario where a receiver such as receiver 400 has introduced a frequency spur. Wanted signal $x_1$ may be transposed into the frequency domain as $X_1(f)$, which is plotted on frequency axis 500. $X_1(f)$ may have been modulated onto a carrier frequency $f_{c1}$ for wireless transmission, and accordingly receiver 400 may select a mixing frequency $f_{m1}=f_{c1}$ (shown as 504) in order to perform direct conversion of $X_1(f)$ to baseband. However, a frequency spur 502 may be generated in the receive path at $f_{spur}$, and may fall within the frequency band of wanted signal $X_1(f)$. Accordingly, mixer 406 will transpose both frequency spur 502 and wanted signal $X_1(f)$ to baseband frequencies, as shown in FIG. 5. Direct conversion output signal 420 will consequently be corrupted as include frequency spur 502 is present within the frequency band of wanted signal $X_1(f)$ at baseband.

However, the location of frequency spurs in some cases may be calculated based on properties of interference-generating components. For example, the spur 502 may be directly caused by local oscillators 410 and 412, and may be present in one or both of output signals 422. In an exemplary aspect of the disclosure, a frequency spur may be present if the below condition of Equation 1 is satisfied:

$$m*f_{m1} \pm n*f_{m2} \leq BW/2 \qquad (1),$$

where m and n are integers, $f_{m1}$ and $f_{m2}$ are the first and second mixing frequencies as defined above, and BW is the bandwidth a wanted signal.

As previously detailed, receiver 400 may be an LTE receiver configured to receive wireless radio signals at two LTE carrier frequencies, such as e.g. $f_{c1}=901$ MHz and $f_{c2}$ 1800 MHz. Receiver 400 may then set local oscillators 410 and 412 to drive mixers 406 and 408 with mixing frequencies $f_{m1}=f_{c1}=901$ MHz and $f_{m2}=f_{c2}=1800$ MHz, respectively, in order to perform direct conversion. The bandwidth of wanted signals $x_1$ and $x_2$ may be 20 MHz, i.e. BW/2=10 MHz.

Direct conversion output signal 420 may accordingly contain spurious interference if the condition in Equation 1 holds, i.e. $m*f_{m1} \pm n*f_{m2} \leq BW/2$. Substituting in m=2 and n=1, spur frequencies 2*901±1*1800=2 MHz and 3602 MHz. Accordingly, a frequency spur will be present as the bandwidth BW of $x_1$ is 20 MHz, i.e. 2 MHz<BW/2=10 MHz.

A frequency spur such as frequency spur 502 in accordance with Equation 1 will therefore be present at +2 MHz from the center frequency of wanted signal $x_1$, as shown in FIG. 5. Frequency spur 502 will consequently degrade wanted signal $x_1$ at baseband, and performance of direct conversion receiver 400 will suffer.

However, low-IF reception may be utilized in order to avoid potential interference due to spur 502. As previously detailed, low-IF receivers use mixing frequencies which are not matched to target carrier frequencies, i.e. $f_{m1} \neq f_{c1}$ and $f_{m2} \neq f_{c2}$. Mixing frequencies $f_{m1}$ and $f_{m2}$ may consequently be selected in order to ensure that a spur such as spur 502 falls outside of the frequency band of a wanted signal, thereby avoiding any potentially negative impacts of frequency spurs.

Consequently, $f_{m1}$ or $f_{m2}$ may be adjusted in order to shift the location of a frequency spur. For example, $f_{m1}$ may be shifted by either ±BW/2=10 MHz to yield $f_{m1}'$. Equation 1 therefore provides $m*f_{m1}' \pm n*f_{m2}=2*(901+10)\pm 1*1800=+22$ MHz and +3622 MHz (with $f_{m1}$ shifted by +BW/2 to $f_{m1}'$) and $m*f_{m1}' \pm n*f_{m2}=2*(901-10)\pm 1*1800=-18$ MHz and +3582 MHz (with $f_{m1}$ shifted by −BW/2 to $f_{m1}'$). Accordingly, either selecting $f_{m1}'=f_{m1}+BW/2$ or $f_{m1}'=f_{m1}-BW/2$ shifts a potential frequency spur outside of the frequency band of wanted signal $x_1$ (which extends from −10 MHz to +10 MHz). However, direct conversion is no longer being performed as $f_{m1}'\neq f_{c1}$. Instead, low-IF reception is being performed, and consequently wanted signal $x_1$ will be transposed to an intermediate frequency $f_{IF}$ defined by $f_{IF}=|f_{c1}-f_{m1}'|$ (as explained regarding FIGS. 3A-3D).

Other values could additionally be used for any of the parameters as utilized above. For example, any number of carrier frequencies $f_{c1}$ and $f_{c2}$ may be utilized, resulting in many possibilities for $f_{m1}$ and $f_{m2}$. Additionally, $f_{m1}$ may be shifted by a number of potential values to obtain $f_{m1}'$. For example, a receiver may perform an analysis to identify an optimal frequency shift value δ to apply to $f_{m1}$ in order to obtain $f_{m1}'$ (i.e. $f_{m1}'=f_{m1}+δ$). An exemplary receiver may then apply a shift value δ that results in a frequency spur being displaced outside of a wanted frequency band.

Figure 6:
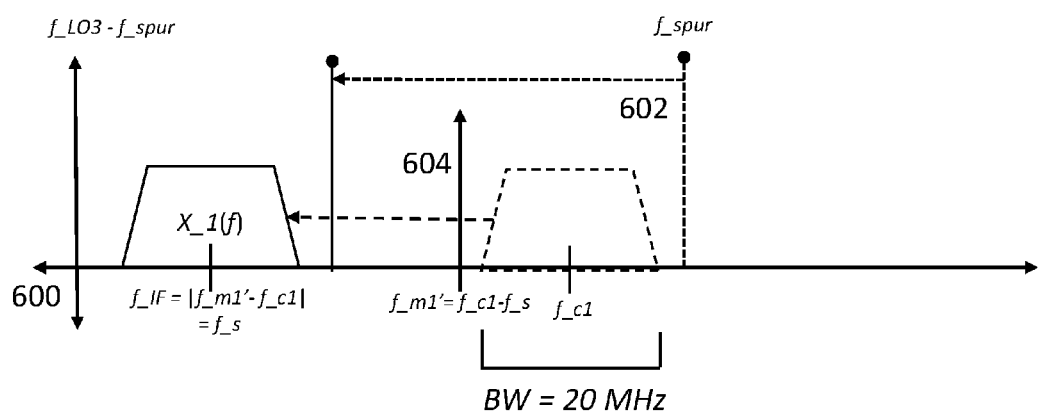
FIG. 6 shows a frequency domain plot of low-IF reception.

An exemplary scenario illustrating a shift in a local oscillation frequency to mitigate spurious interference is shown in FIG. 6. Mixing frequency $f_{m1}'$ 604 may be utilized instead of original mixing frequency $f_{m1}$, where $f_{m1}'=f_{m1}+δ$. Frequency spur 602 may displaced outside of the frequency band of wanted signal $X_1(f)$ according to Equation 1. The application of mixing frequency $f_{m1}'$ accordingly shifts both wanted signal $X_1(f)$ and frequency spur 602 to intermediate frequency $f_{IF}=|f_{m1}'-f_{c1}|$. As shown in FIG. 6, frequency spur 602 still falls outside of the frequency band of wanted signal $X_1(f)$ at $f_{IF}$, and accordingly spur-free wanted signal $X_1(f)$ may be extracted using a channel selection filter such as a band pass filter.

A switch from direct conversion to low-IF reception may accordingly eliminate issues stemming from spurious interference by proper selection of mixing frequencies $f_{m1}$ and $f_{m2}$. An exemplary system may perform an analysis to first determine if spurious interference is present or not. For example, an exemplary system may perform a signal level measurement inside the frequency band of a wanted signal. If spurious interference is detected, a receiver may then select a new mixing frequency in order to mitigate issues stemming from spurious interference. An exemplary system may also determine that only low-power spurious interference is present, and accordingly may decide to continue with direct conversion reception as the spurious interference has only a minimal impact. An exemplary system may also determine that the frequency band of a wanted signal is substantially free of spurious interference, such as e.g. determining that the spurious interference is below a predefined threshold, and continue with direct conversion reception.

If a decision is made to select a new mixing frequency an exemplary receiver may need to adjust the reception processing in order to correctly extract a wanted signal from the intermediate frequency. As previously detailed regarding FIG. 6, a low-IF receiver may band-pass filter the wanted frequency band surrounding the intermediate frequency, i.e. perform a channel selection of wanted signal $X_1(f)$ centered at intermediate frequency $f_{IF}$.

Figure 7:
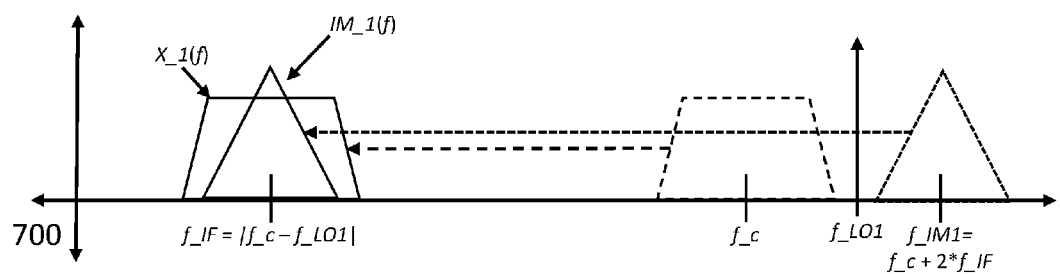
FIG. 7 shows an example of image frequency interference in low-IF reception.

However, unavoidable problems are introduced into any system implementing low-IF reception. Due to the symmetrical nature of the frequency domain, an additional frequency known as an image frequency is transposed onto the intermediate frequency $f_{IF}$ along with a wanted signal. FIG. 7 illustrates an exemplary scenario in which a signal $IM_1(f)$ located at image frequency $f_{IM1}$ is transposed along with desired signal $X_1(f)$ to intermediate frequency $f_{IF}$. A receiver implementing low-IF reception must compensate for the presence of image signal $IM_1(f)$ by performing various image cancellation techniques in order to retain signal integrity of wanted signal $X_1(f)$ following demodulation.

The location of an image frequency $f_{IM}$ on the frequency axis is defined below in Equation 2:

$$f^{IM}=f_c+2*f_{IF}, f_{LO}>f_c$$

$$f_{IM}=f_c-2*f_{IF}, f_{LO}<f_c \quad (2),$$

where $f_c$ is the frequency location of a wanted signal, $f_{IF}$ is the intermediate frequency defined by $f_{IF}=|f_{LO}-f_c|$, and $f_{LO}$ is the local oscillator frequency.

Accordingly, if the local oscillator frequency $f_{LO}$ used for transposing a wanted signal located at $f_c$ to an intermediate frequency $f_{IF}$ is greater than the wanted signal frequency $f_c$, the image frequency will be located at $f_{IM}=f_c+2*f_{IF}$. In contrast, if the local oscillator frequency is less than the wanted signal frequency, the image frequency will be located at $f_{IM}=f_c-2*f_{IF}$. Note that $f_{LO}$ may be selected as either $f_{LO1}=f_c+f_{IF}$ or $f_{LO2}=f_c-f_{IF}$ and the intermediate frequency will remain unchanged. In other words, a low-IF receiver can select one of two possible values of $f_{LO}$ and utilize the same intermediate frequency $f_{IF}$.

A low-IF receiver may utilize either $f_{LO}=f_c+f_{IF}>f_c$ or $f_{LO}=f_c-f_{IF}<f_c$ and still use the same intermediate frequency. As detailed in Equation 2, selecting $f_{LO}>f_c$ results in the image frequency being at a slightly higher frequency ($+2*f_{IF}$) than the frequency of the wanted signal $f_c$. In contrast, selecting $f_{LO}<f_c$ results in the image frequency being at a slightly lower frequency ($-2*f_{IF}$) than $f_c$. By selecting between either of these values for $f_{LO}$, a low-IF receiver may select either a higher or lower frequency to be the image frequency.

Figure 8A:
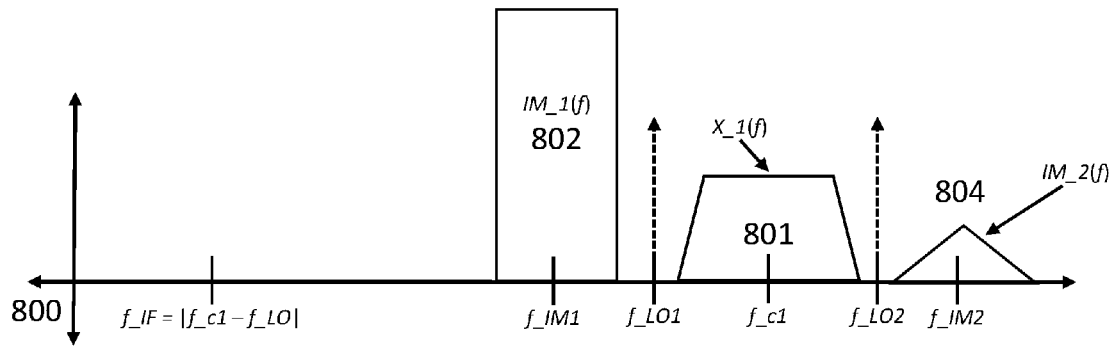
FIGS. 8A-8C show various frequency domain plots of low-IF reception.
Figure 8B:
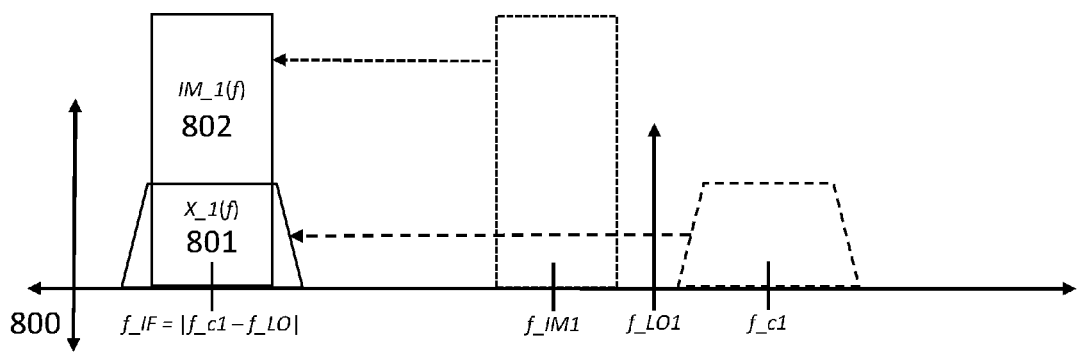
Figure 8C:
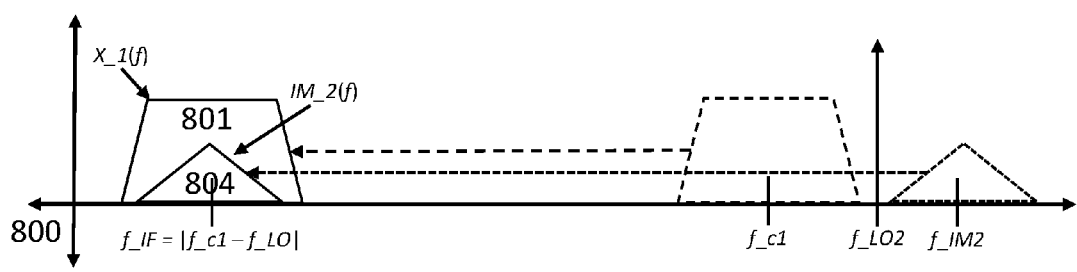

FIGS. 8A-8C illustrate a scenario in which an exemplary low-IF receiver may select either a lower local oscillation frequency $f_{LO1}$ or a higher local oscillation frequency $f_{LO2}$ in order to select a minimally-interfering image frequency. For example, desired signal $X_1(f)$ 801 may be modulated at a carrier frequency $f_{c1}$, and a receiver may process a received signal contained $X_1(f)$ in order to downconvert it to an intermediate frequency $f_{IF}$. Accordingly, two local oscillator frequencies are available given $f_{c1}$ and $f_{IF}$ defined as $f_{LO1}=f_{c1}+f_{IF}$ and $f_{LO2}=f_{c1}-f_{IF}$. However, the selection of either of these local oscillator frequencies results either image frequency signal 802 at $f_{IM1}$ or image frequency signal 804 at $f_{IM2}$ being transposed along with desired signal $X_1(f)$ to intermediate frequency $f_{IF}$.

As shown in FIG. 8A, the frequency band surrounding image frequency $f_{IM1}$ may contain an image signal 802 having large signal power. In contrast, the frequency band surrounding image frequency $f_{IM2}$ may contain an image signal 804 having relatively low signal power.

Selecting $f_{LO1}$ as the local oscillator frequency will accordingly transpose high-power image signal 804 at image frequency $f_{IM1}$ to intermediate frequency $f_{IF}$ along with wanted signal 801, as shown in FIG. 8B. Wanted signal $X_1(f)$ 801 will consequently be highly corrupted at intermediate frequency $f_{IF}$ due to the presence of image signal 802. Accordingly, an output of a low-IF receiver may be of unacceptable quality.

In contrast, $f_{LO2}$ may be selected as the local oscillator frequency as shown in FIG. 8C. Low-power image signal 804 will then be transposed along with wanted signal $X_1(f)$ 801 to intermediate frequency $f_{IF}$. Consequently, wanted signal $X_1(f)$ 801 at intermediate frequency $f_{IF}$ will have a relatively low degree of corruption compared to the scenario in which $f_{LO1}$ was selected as the intermediate frequency.

Accordingly, a low-IF receiver may selectively choose a local oscillation frequency in order to select an image frequency that will result in the lowest loss of signal integrity. An exemplary low-IF receiver may perform a signal level measurement of neighboring channels to determine which, if any, contain relatively low signal power. An analysis may be performed on directly neighboring channels, or alternatively on channels that are located further away in the frequency domain. An exemplary low-IF receiver may then select this low-power channel as an image frequency by selecting an appropriate local oscillation frequency. Accordingly, image frequency corruption at an intermediate frequency may be reduced, thereby improving overall reception quality.

Figure 9:
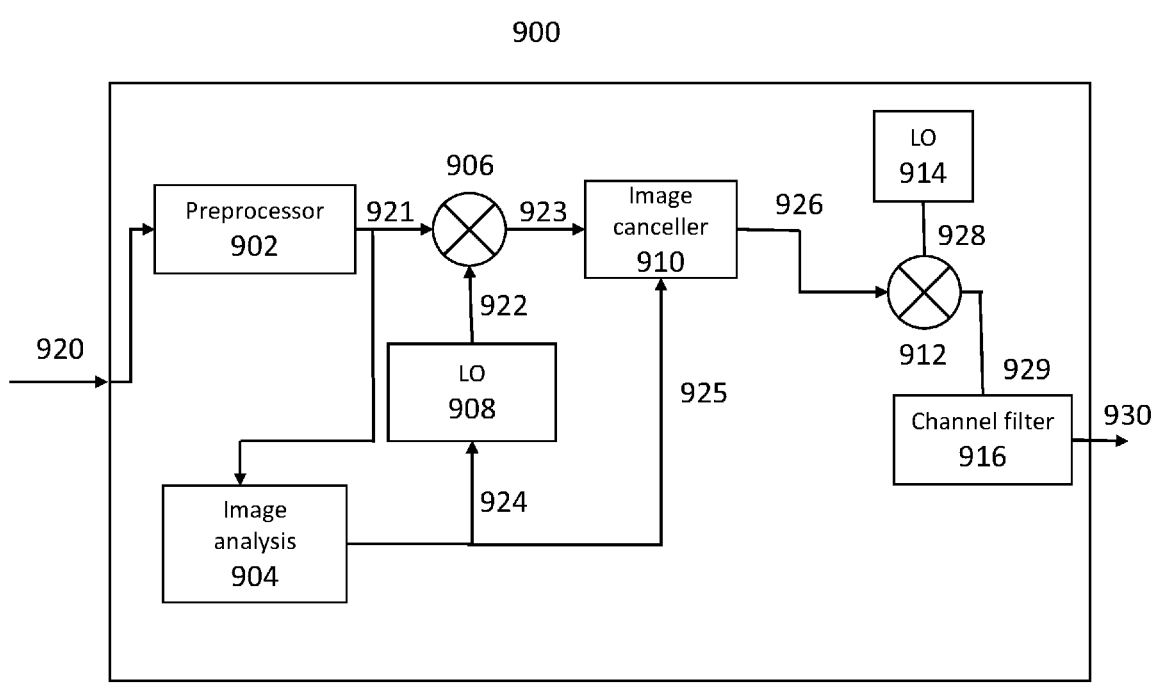
FIG. 9 shows a wireless receiver with adaptive intermediate frequency selection.

FIG. 9 illustrates an exemplary receiver 900 implementing low-IF reception with optimized image frequency selection. Receiver 900 may receive an input signal 920, such as e.g. from an antenna. Input signal 920 may be a wideband radio signal. For example, input signal 920 may contain a frequency spectrum such as illustrated in FIG. 3A, which contains a wanted signal X(f) modulated onto a carrier frequency $f_{c1}$.

Input signal 920 may be provided to preprocessor 902. Preprocessor 902 may perform pre-processor operations such as amplification or noise reduction and provide a resulting output signal 921 to image frequency analysis circuit 904 and mixer 906.

As described above in relation to FIGS. 3A and 3B, mixer 906 may accordingly multiply signal 921 with local oscillation frequency $f_{LO}$ provided by local oscillation oscillator 908. This operation may accordingly shift a wanted signal X(f) in the frequency domain from original carrier frequency $f_c$ to an intermediate frequency defined by $f_{IF}=|f_c-f_{LO}|$.

The selection of local oscillation frequency $f_{LO}$ may be critical in reducing the impact of image frequency interference. As shown in FIGS. 8A and 8B, selecting local oscillation frequency $f_{LO}=f_{LO1}$ results in an image signal 802 at a lower frequency than wanted signal carrier frequency $f_c$ being transposed on top of wanted signal $X_1(f)$ 801 at intermediate frequency $f_{IF}$. Selecting local oscillation frequency $f_{LO}=f_{LO2}$ results in an image signal 804 at a lower frequency than wanted signal carrier frequency $f_c$ being transposed on top of wanted signal $X_1(f)$ 801 at intermediate frequency $f_{IF}$. The selection of $f_{LO}=f_{LO1}$ results in high-power image signal 802 interfering with wanted signal $X_1(f)$, while the selection of $f_{LO}=f_{LO2}$ results in low-power image signal 804 interfering with wanted signal $X_1(f)$. Accordingly, selecting $f_{LO}=f_{LO2}$ may result in improved output signal integrity at receiver output 930.

Image frequency analysis circuit 904 may therefore be utilized to control local oscillator 908 in order to select either $f_{LO1}$ or $f_{LO2}$ as local oscillation signal 922. Image frequency analysis circuit 904 may accordingly perform a signal level measurement on a frequency band containing potential image frequencies $f_{IM1}$ and $f_{IM2}$, as shown in FIGS. 8A to 8C and FIG. 10.

Figure 10:
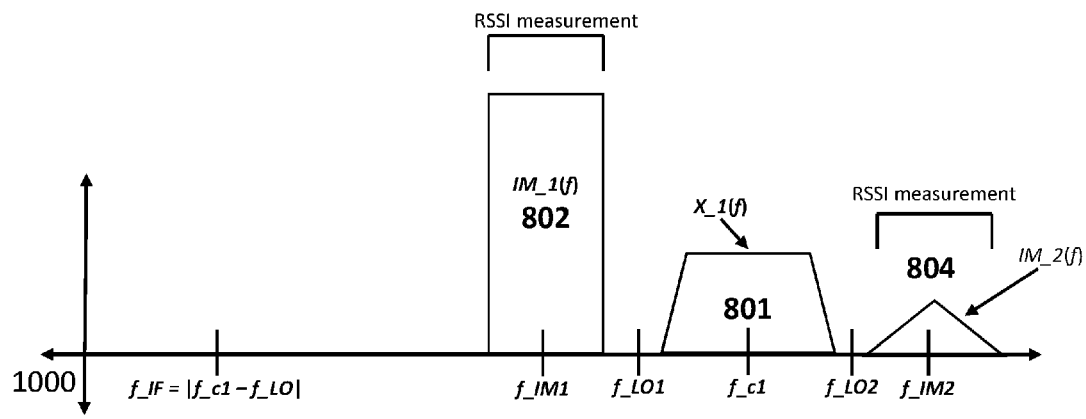
FIG. 10 shows a frequency domain plot of channel measurements for intermediate frequency selection.

As shown in FIG. 10, image frequency analysis circuit 904 may perform a signal level measurement such as e.g. a signal power measurement. This signal power measurement may be e.g. an RSSI measurement that measures the total signal energy in the frequency band that contains image frequencies $f_{IM1}$ and $f_{IM2}$.

Figure 11:
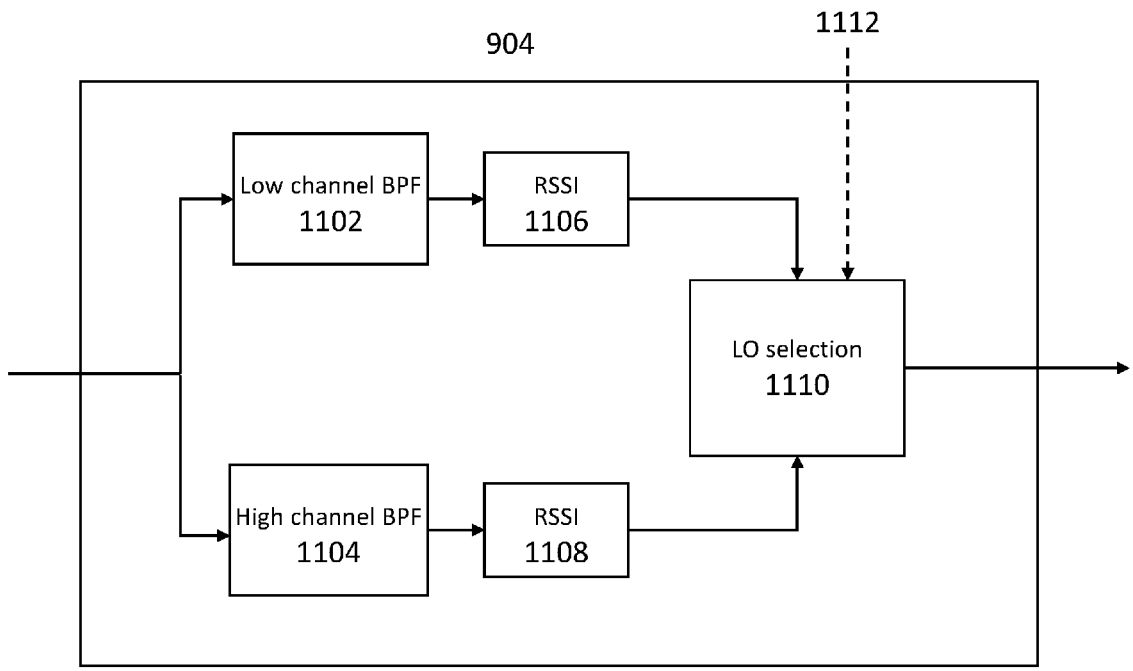
FIG. 11 shows an exemplary internal component of a wireless receiver with adaptive intermediate frequency selection.

As shown in FIG. 11, image frequency analysis circuit 904 may receive an input signal from e.g. preprocessor 902. Image frequency analysis circuit 904 may provide the received input signal to low channel BPF 1102 and high channel BPF 1104. Low channel BPF 1102 and high channel BPF 1104 may subsequently band pass filter the respectively received input signals in order to isolate a frequency band containing the image frequencies $f_{IM1}$ and $f_{IM2}$ (and consequently containing image signals 802 and 804).

The outputs of low channel BPF 1102 and high channel BPF 1104 may be respectively provided to RSSI measurement circuits 1106 and 1108. RSSI measurement circuits 1106 and 1108 may perform an RSSI measurement on the received band-pass filtered signals in order to measure the total energy contained in the image frequency bands surrounding $f_{IM1}$ and $f_{IM2}$. These RSSI measurements may then be provided to local oscillator selection circuit 1110.

Local oscillator selection circuit 1110 may accordingly select an appropriate local oscillation signal based on the provided RSSI measurements. Local oscillator selection circuit 1110 may be configured select a local oscillation frequency $f_{LO}$ that results in the image frequency band with a lower signal power (e.g. RSSI) being selected as the image frequency. For example, image frequency analysis circuit 904 may be provided with an input signal with a frequency spectrum as shown in FIG. 8A and FIG. 10. Low channel BPF 1102 and high channel BPF 1104 along with RSSI measurement circuits 1106 and 1108 may measure the signal power contained in each of image signal 802 and 804 frequency bands and provide the resulting measurements to local oscillator selection circuit 1110.

As shown in FIG. 8A and FIG. 10, the image frequency band at $f_{IM2}$ containing image signal 804 contains less signal power than the frequency band at fail containing image signal 802. Accordingly, local oscillator selection circuit 1110 may identify the image frequency band at $f_{IM2}$ as the optimal selection. Local oscillator selection circuit 1110 may then select local oscillation frequency $f_{LO}=f_{LO2}$, and provide $f_{LO2}$ as the output oscillation frequency.

In conventional LTE systems, image frequencies $f_{IM1}$ and $f_{IM2}$ may fall within the frequency band of neighboring carrier channels to wanted carrier frequency $f_{c1}$. Accordingly, image frequency analysis circuit 904 may perform a measurement such as e.g. an RSSI measurement on either both higher and lower carrier channels in order to determine which neighboring carrier channel contains the lowest total signal power. In certain exemplary scenarios, potential image frequencies $f_{IM1}$ and $f_{IM2}$ may only be located in the carrier channel directly lower than carrier frequency $f_{c1}$ and the carrier channel directly higher than carrier frequency $f_{c1}$. Consequently, image frequency analysis circuit 904 may perform RSSI measurements of the adjacent carrier channels to $f_{c1}$ and select a local oscillation frequency $f_{LO}$ based on the adjacent carrier channel having a lower signal power. Alternatively, image frequencies $f_{IM1}$ and $f_{IM2}$ may be located in carrier channels that are not directly neighboring to carrier frequency $f_{c1}$. Accordingly, low channel BPF 1102 and high channel BPF 1104 may be adjusted to filter any potential image frequency band based on the selection of intermediate frequency $f_{IF}$.

Other implementations of local oscillator selection circuit 1110 and image frequency analysis circuit 904 are possible. For example, local oscillator selection circuit 1110 may select from more than two options for $f_{LO}$ other than $f_{LO1}$ and $f_{LO2}$. However, the intermediate frequency would accordingly be adjusted by deviating from $f_{LO}=f_c \pm f_{IF}$, and additional components such as local oscillator 914 and channel BPF 916 would need to be adapted in low-IF receiver 900 in order to perform suitable demodulation.

Additionally, receive signal quality indicator 1112 may also be provided to image frequency analysis circuit 904 and local oscillator selection circuit 1110 as shown in FIG. 11. Receive signal quality indicator 1112 may provide local oscillator selection circuit 1110 with a value representing the signal level of the output signal of the receiver. Local oscillator selection circuit 1110 may trigger a switch in $f_{LO}$ if receive signal quality indicator 1112 indicates poor receive signal quality. For example, local oscillator selection circuit 1110 may currently have $f_{LO2}$ selected as the local oscillator output signal because the higher image frequency band currently contains lower power than the lower image frequency band. However, local oscillator selection circuit 1110 may be configured to switch the local oscillator output signal to $f_{LO1}$ in order to attempt to remedy poor reception signal quality indicated by receive signal quality indicator 1112. For example, $RSSI_H$ may only be slightly lower than $RSSI_L$, i.e. $RSS_H=RSSI_L-\Delta$ where $\Delta$ is an arbitrary small value and $RSSI_H$ and $RSSI_L$ are the high and low channel RSSI measurements, respectively. Accordingly, upon reception of a poor receive signal quality indication signal 1112 local oscillator selection circuit 1110 may switch local oscillator output signal from $f_{LO2}$ to $f_{LO1}$ in order to observe if $f_{LO1}$ produces a better receive signal quality indication signal 1112. In other configurations, local oscillator selection circuit 1110 may perform a decision to select $f_{LO1}$ or $f_{LO2}$ based on one or more thresholds regarding the difference between channel signal powers (e.g. $|RSSI_H-RSSI_L|$) and receive signal quality indication signal 1112.

Local oscillator selection circuit 1110 may also compare receive signal quality indication signal 1112 to a threshold. Local oscillator selection circuit 1110 may then decide whether to select a different local oscillation frequency based on the comparison result. For example, local oscillator selection circuit 1110 may be configured to switch to a different local oscillation frequency only when receive signal quality indication signal 1112 falls below the threshold. Accordingly, local oscillator selection circuit 1110 may be configured to maintain the same local oscillation frequency as long as receive signal quality indication signal 1112 remains above a threshold. If receive signal quality indication signal 1112 falls below the threshold, local oscillator selection circuit 1110 may select a different local oscillation frequency. Alternatively, local oscillator selection circuit 1110 may be configured to perform a difference comparison (such as described above) between $RSSI_H$ and $RSSI_L$ in order to select a local oscillation frequency if receive signal quality indication signal 1112 falls below the threshold.

In a further exemplary aspect of the disclosure, local oscillator selection circuit 1110 may use a threshold to limit how quickly the local oscillator output frequency $f_{LO}$ may switch between $f_{LO1}$ and $f_{LO2}$. For example, local oscillator selection circuit 1110 may be set to output $f_{LO1}$ as the local oscillator frequency because $RSSI_L<RSSI_H$. However, due to the time-varying nature of a received wireless signal $RSSI_H$ may experience a sudden drop in signal power, resulting in $RSSI_H<RSSI_L$. Instead of immediately switching from $f_{LO1}$ to $f_{LO2}$, local oscillator selection circuit 1110 may calculate $|RSSI_H-RSSI_L|$. Local oscillator selection circuit 1110 may then compare $|RSSI_H-RSSI_L|$ to a threshold $\mu$, i.e. determine if $|RSSI_H-RSSI_L|\geq\mu$. If $|RSSI_H-RSSI_L|<\mu$, local oscillator selection circuit 1110 may continue to select $f_{LO1}$ as the local oscillator output frequency. In other words, local oscillator selection circuit 1110 may be configured to switch between $f_{LO1}$ and $f_{LO2}$ only when there is a large difference in $RSSI_H$ and $RSSI_L$.

As previously detailed, local oscillator selection circuit 1110 may utilize both a threshold involving $RSSI_H$ and $RSSI_L$ in addition to receive signal quality indication signal 1112. For example, the frequency switch threshold $\mu$ may be adapted based on receive signal quality indication signal 1112, i.e. raised or lowered based receive signal quality indication signal 1112. Local oscillator selection circuit 1110 may for example reduce $\mu$ if a low receive signal quality indication signal 1112 is received, thereby weighting the circuit towards performing a switch between $f_{LO1}$ and $f_{LO}$. Alternatively, local oscillator selection circuit 1110 may for example increase $\mu$ if a high receive signal quality indication signal 1112 is received, thereby weighting the circuit against performing a switch between $f_{LO1}$ and $f_{LO}$.

Alternatively, local oscillator selection circuit 1110 may perform averaging of one or more of the provided input signals. For example, local oscillator selection circuit 1110 may calculate an average value of the input signals from RSSI measurement circuit 1106 and RSSI measurement circuit 1108. Local oscillator selection circuit 1110 may then utilize the averaged input signals in determining an appropriate local oscillator frequency. This implementation may avoid unnecessary rapid switching between local oscillator frequencies that may be caused by short term changes in the signal levels due to fading.

Local oscillator selection circuit 1110 may also average receive signal quality indication signal 1112. Local oscillator selection circuit 1110 may then use the averaged receive signal quality indication signal 1112 to select a local oscillation frequency, such as e.g. comparing the averaged receive signal quality indication signal 1112 to a threshold. As a result, repeated switching between local oscillation frequencies may be avoided that would otherwise be triggered by temporary fluctuations in receive signal quality indication signal 1112.

Referring back to FIG. 9, image frequency analysis circuit 904 may provide a control signal specifying the selected $f_{LO}$ to mixer 906. For example, image frequency analysis circuit 924 may specify $f_{LO}=f_{LO1}$. Mixer 906 may then perform frequency mixing on preprocessed input signal 921 with mixing signal 922 having frequency $f_{LO1}$ as supplied by local oscillator 908. The resulting output signal 923 may then have a frequency spectrum as shown in FIG. 8B.

Signal 923 may be provided to image cancellation circuit 910, which may perform processing in order to compensate for the presence of an image frequency signal in signal 923. Such image cancellation techniques are known in the field of low-IF reception and will not be explained in detail. Image cancellation circuit 910 may also receive a control signal from image frequency analysis circuit 904. As shown in FIG. 11, image frequency analysis circuit 904 may have already performed certain processing operations regarding the image frequency signal present in signal 923. Accordingly, image canceller 910 may utilize signal 925 to adapt image cancellation techniques in order to further compensate for the presence of any image frequency signal.

Image canceller 910 may provide output signal 926 to mixer 912. Mixer 912 may mix signal 926 containing a wanted signal $X_1(f)$ and reduced image signal components at a frequency provided by local oscillator 914. Local oscillator 914 may provide mixer 912 with a mixing frequency $f_{LO3}=f_{IF}$ with local oscillation signal 928. Mixer 912 may accordingly mix wanted signal $X_1(f)$ and remaining image signal components from intermediate frequency $f_{IF}$ to baseband frequencies. Output signal 929 of mixer 912 may be provided to channel filter 916, which may be filter that selects the frequency band containing wanted signal $X_1(f)$ and attenuates other unwanted frequencies. Wanted signal $X_1(f)$ at baseband frequencies may accordingly be included in output signal 930.

Figure 12:
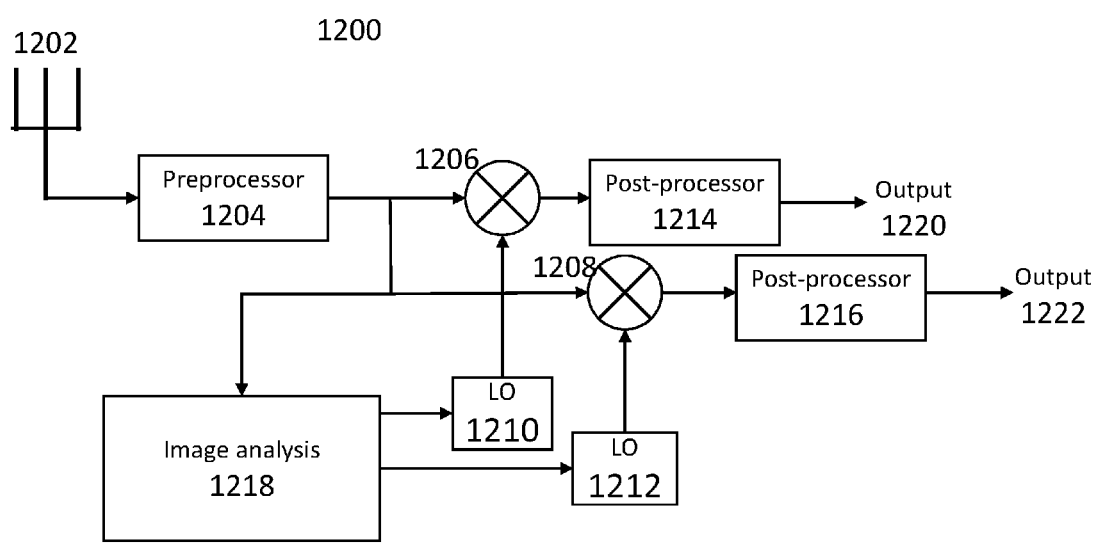
FIG. 12 shows a wireless receiver with adaptive intermediate frequency selection configured to receive signals over multiple carriers.

FIG. 12 shows various components of wireless receiver 1200 according to a further aspect of the disclosure. Wireless receiver 1200 may function in a similar manner as to IF receiver 400 as shown in FIG. 4. For example, components such as antenna 1202, preprocessor 1204, mixers 1206 and 1208, and local oscillators 1210 and 1212 may function in similarly to their counterparts in FIG. 4. Wireless receiver 1200 may be configured to receive wireless radio signals such as LTE signals over antenna 1202. Accordingly, mixers 1206 and 1208 may be configured to mix wirelessly received LTE signals according to local oscillator frequencies provided by local oscillators 1210 and 1212. The local oscillator frequencies provided by local oscillators 1210 and 1212 may consequently be selected to correspond with LTE carrier frequencies in order to receive signals wirelessly transmitted thereon.

Wireless receiver 1200 may additionally include image frequency analysis circuit 1218. Image frequency analysis circuit 1218 may provide local oscillators 1210 and 1212 with a control signal specifying respectively assigned local oscillation frequencies. Mixers 1206 and 1208 may then mix received input signals according to the provided local oscillation frequencies.

Wireless receiver 1200 may be configured to perform both direct conversion and low-IF reception. For example, wireless receiver 1200 may initially perform direct conversion to receive wireless signals. Alternatively, wireless receiver 1200 may initially perform low-IF reception of wireless signals.

Image frequency analysis circuit 1218 may be configured to control whether wireless receiver 1200 performs direct conversion or low-IF reception. For example, image frequency analysis circuit 1218 may control local oscillators 1210 and 1212 to output oscillation frequencies matching the frequencies of wireless carrier signals containing wanted data. This operation may result in direct conversion, as shown in FIG. 3D.

Alternatively, image frequency analysis circuit 1218 may control local oscillators 1210 and 1212 to output oscillation frequencies that do not match the frequencies of wireless carrier signals containing wanted data. Accordingly, mixers 1206 and 1208 may transpose wanted signals modulated onto given carrier frequencies onto intermediate frequencies, as shown in FIGS. 3B to 3C. Wireless receiver 1200 may accordingly perform low-IF reception.

Figure 13:
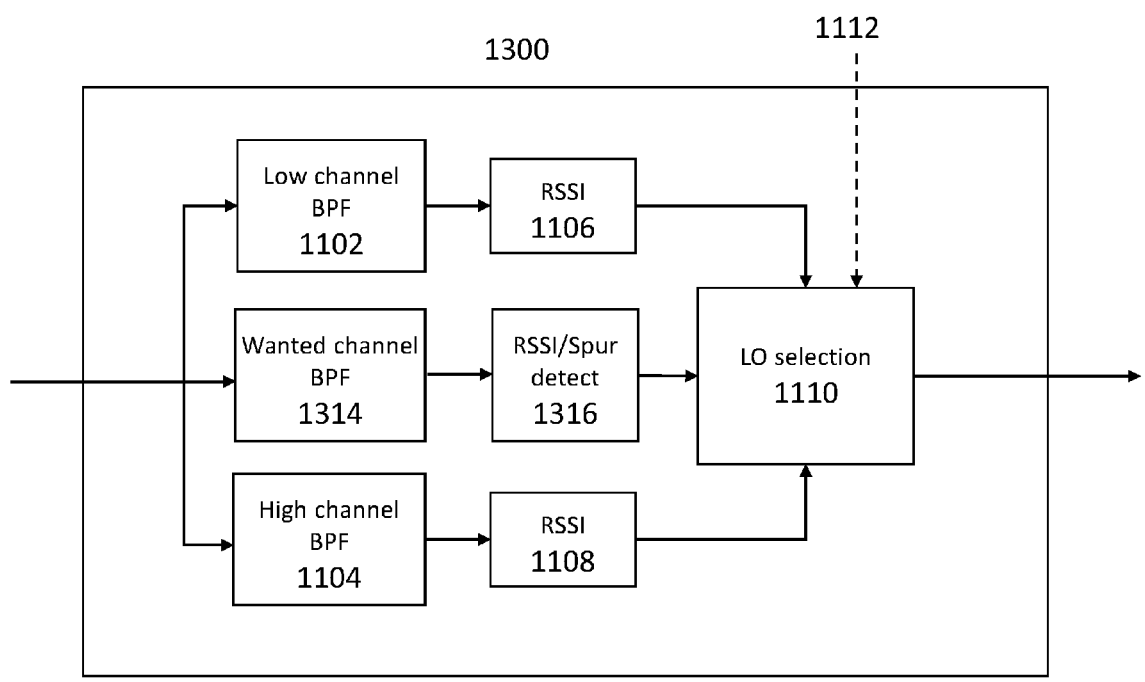
FIG. 13 shows an exemplary internal component of a wireless receiver with adaptive intermediate frequency selection configured to receive signals over multiple carriers.

Image frequency analysis circuit 1218 may contain similar internal components and circuits to image frequency analysis circuit 1300 as shown in FIG. 13. Image frequency analysis circuit 1300 may additionally be structured in a similar manner to image frequency analysis circuit 904 as detailed in FIG. 11, and accordingly may contain components such as low channel BPF 1102, high channel BPF 1104, RSSI measurement circuits 1106 and 1108, local oscillator selection circuit 1110, and receive signal quality indication signal 1112 that function in a similar manner to as described regarding FIG. 11. Image frequency analysis circuit 1300 may additionally contain wanted channel BPF 1314 and RSSI/spur detection circuit 1316. Wanted channel BPF 1314 and RSSI/spur detection circuit 1316 may be utilized to detect spurious interference in a target frequency band. Wanted channel BPF 1314 may filter an input signal to select only a frequency band containing a wanted signal, such as the frequency band of wanted signal $X_1(f)$ 801 shown in FIGS. 8A to 8C. The frequency band of wanted signal $X_1(f)$ 801 may be from $[f_{c1}-BW/2, f_{c1}+BW/2]$, where $f_{c1}$ is the carrier frequency used to modulate wanted signal $X_1(f)$ and BW is the bandwidth of wanted signal $X_1(f)$. Alternatively, wanted channel BPF 1314 may use a passband from $[f_{c1}-BW/2-\alpha, f_{c1}+BW/2+\beta]$, where $\alpha$ and $\beta$ are constants chosen in order to compensate for the transition band of wanted channel BPF 1314.

Wanted channel BPF 1314 may provide bandpass-filtered signal to RSSI/spur detection circuit 1316. RSSI/spur detection circuit 1316 may measure the RSSI of the wanted channel signal provided by wanted channel BPF 1314. Local oscillator selection circuit 1110 may then utilize the measured RSSI in order to select a local oscillation frequency. For example, local oscillation circuit 1110 may determine that the wanted channel RSSI is substantially higher than the RSSI of the current image frequency band (as determined by either the selection of $f_{LO1}$ or $f_{LO2}$ as the local oscillation frequency). Accordingly, local oscillation circuit 1110 may interpret this determination to indicate that the image frequency band is minimally interfering with the wanted signal, and accordingly no change in local is necessary.

RSSI/spur detection circuit 1316 may additionally perform an analysis on the bandpass-filtered signal in order to detect the presence of frequency spurs in the wanted signal frequency band. RSSI/spur detection circuit 1316 may perform signal level measurements, such as e.g. RSSI measurements, in order to detect frequency spurs. RSSI/spur detection circuit 1316 may use the relationship defined by Equation 1 in order to detect frequency spurs. RSSI/spur detection circuit 1316 may provide an output to local oscillator selection circuit 1110 that indicates the presence of frequency spurs. Local oscillator selection circuit 1110 may adjust the local oscillation frequency based on the indicated presence of frequency spurs, $RSSI_L$ and $RSSI_H$ measurements from RSSI measurement circuits 1106 and 1108, and/or receive signal quality indication signal 1112. For example, local oscillator selection circuit 1110 may adjust the local oscillation frequency from $f_{LO}=f_{c1}$ (direct conversion) to $f_{LO}=f_{c1}+\delta$ (low-IF reception, where $\delta$ is the frequency shift amount that defines the location of $f_{IF}$) if a frequency spur is detected by RSSI/spur detection circuit 1316 and receive signal quality indication signal 1112 indicates poor reception signal quality.

Alternatively, local oscillator selection circuit 1110 may continue utilizing direct conversion receive signal quality indication signal 1112 indicates good reception signal quality, regardless of the detection of a frequency spur by RSSI/spur detection circuit 1316.

Local oscillator selection circuit 1110 may select a variety of values for $\delta$ (for $f_{LO}=f_{c1}+\delta$). For example, local oscillator selection circuit 1110 may select $\delta=0$ for direct conversion, i.e. $f_{LO}=f_{c1}$. Alternatively, local oscillator selection circuit 1110 may select $\delta$ as a non-zero constant for low-IF reception. In an exemplary aspect of the disclosure, local oscillator selection circuit 1110 may select $\delta=\pm BW/2$, which may shift a frequency spur out of a wanted signal frequency band, as described regarding FIG. 7. Local oscillator selection circuit 1110 may select $\delta=+BW/2$ if $RSSI_H>RSSI_L$, i.e. the higher channel has a greater signal power than the lower channel, and may alternatively select $\delta=-BW/2$ if $RSSI_H<RSSI_L$. Values for $\delta$ other than (0, $-BW/2$, and $+BW/2$) are additionally possible; however, modifying $\delta$ also results in an adjustment of the intermediate frequency $f_{IF}$ that may need to compensated for by other receiver components.

Wireless receiver 1200 may accordingly be configured to switch between direct conversion and low-IF reception based on the quality of reception. For example, wireless receiver 1200 may detect the presence of spurious interference while performing direct conversion. Image frequency analysis circuit 1218 may perform a measurement in a wanted signal frequency band in order to detect such spurious interference, e.g. by measuring the frequency band surrounding $f_{c1}$ as shown in FIG. 5. Image frequency analysis circuit 1218 may consequently detect the presence of frequency spur 502 in the frequency band surrounding wanted signal 504. Alternatively, spurious interference may be detected by a feedback operation, such as e.g. by performing measurements on output signals 1220 and 1222 to detect a spur present at baseband after demodulation has been performed.

Upon detection of spurious interference, wireless receiver 1200 may switch to low-IF reception. For example, image frequency analysis circuit 1218 may adjust one or both of local oscillators 1210 and 1212 in order to generate a local oscillation frequency that will result in low-IF reception. For example, image frequency analysis circuit 1218 may select a new local oscillation frequency that is sufficient to move a frequency spur such as frequency spur 502 out of the wanted signal frequency band as shown in FIG. 6. Wireless receiver 1200 may accordingly obtain improved reception signal output quality at outputs 1220 and 1222 due to reduction of the effects of spurious interference.

However, the performance of wireless receiver 1200 may subsequently begin to suffer due to the unavoidable effects of image frequencies in low-IF reception. Accordingly, image frequency analysis circuit 1218 may perform a signal power analysis as detailed regarding image frequency analysis circuit 904 in FIGS. 8A to 8C and 10. Image frequency analysis circuit 1218 may be configured to select local oscillator frequencies 1210 and 1212 that reduce the impact of image frequencies. For example, wireless receiver 1200 may be configured to receive wireless LTE signals modulated on carrier frequencies of $f_{c1}$ and $f_{c2}$. Image frequency analysis circuit 1218 may analyze neighboring channels to carrier frequencies of $f_{c1}$ and $f_{c2}$ in order to identify channels that have relatively low signal power and consequently would only provide low levels of interference. Image frequency analysis circuit 1218 may select appropriate local oscillation frequencies for local oscillators 1210 and 1212 in order to correspondingly select image frequency signals with minimal negative impact, as detailed in FIGS. 8A and 8B.

Accordingly, wireless receiver 1200 may reduce the contribution of image frequencies to corruption of a wanted signal in outputs 1220 and 1222. Image frequency analysis circuit 1218 operate according to other previously disclosed features of image frequency analysis circuit 304, such as operating using a reception signal quality indicator or difference thresholds between higher and lower channels.

Wireless receiver 1200 may switch between low-IF reception and direct conversion based on various measurements, such as reception signal quality indicators, power usage, presence of spurious interference, presence of image frequencies, etc. Wireless receiver 1200 may be alternatively configured to initially start in either low-IF reception or direct conversion mode, or may only be configured to operate in one of low-IF reception or direct conversion mode.

Wireless receiver 1200 may be configured to periodically measure a plurality of frequency bands in order to select either low-IF or direct conversion reception. For example, image frequency analysis circuit 1218 of wireless receiver 1200 may be configured in a similar manner as to frequency analysis circuit 1300 as detailed regarding FIG. 13. Accordingly, wireless receiver 1200 may monitor a low channel frequency band, a high channel frequency band, and a wanted channel frequency band. Wireless receiver 1200 may accordingly select either the low channel frequency band or the high channel frequency band as the interfering image frequency for low-IF reception based on the selection of a higher or lower local oscillator frequency. Wireless receiver 1200 may additionally be configured to select direct conversion reception by selecting a local oscillation frequency that matches the carrier frequency of a wanted signal.

Wireless receiver 1200 may be configured to switch to direct conversion reception from low-IF reception based on the detection of spurious interference. For example, wireless receiver 1200 may initially be performing low-IF reception. Accordingly, a frequency spur may be located outside of a wanted signal frequency band, as detailed regarding FIG. 6. The location of frequency spur may be determined based on the selected local oscillator frequencies as applied to Equation 2. Consequently, wireless receiver 1200 may be able to determine the exact location of a frequency spur, which may be located outside of a wanted signal frequency band due because low-IF reception is being performed.

Wireless receiver 1200 may be configured to periodically monitor the frequency band where the frequency spur is located in order to determine the level of interference that the frequency spur would generate. In other words, wireless receiver 1200 may periodically measure the power level of a frequency spur while performing low-IF reception in order to determine the severity of interference that a frequency spur would cause if wireless receiver 1200 were to switch to direct conversion.

Accordingly, wireless receiver 1200 may utilize frequency analysis circuit 1300 to measure the power level of a frequency spur. The passband of wanted channel BPF 1314 may consequently be adapted according to the location of a frequency spur. For example, Equation 2 may be utilized in order to identify the potential location of a frequency spur based on the currently selected local oscillation frequencies used for low-IF reception.

In other words, the passband of wanted channel BPF 1314 may be selected to contain a frequency spur. RSSI/spur detection circuit 1316 may accordingly perform power level measurements (such as e.g. RSSI) and/or spur detection on the frequency band containing a frequency spur. Accordingly, the output of RSSI/spur detection circuit 1316 may indicate the severity or power level of a frequency spur.

As previously detailed, wireless receiver 1200 may be performing low-IF reception, and consequently the frequency spur may be located outside of the frequency band of a wanted signal. However, RSSI/spur detection circuit 1316 may indicate that a generated frequency spur has a negligible or very lower power level, and consequently would minimally interfere with a wanted signal if direct conversion were performed. Local oscillator selection circuit 1110 may then determine that direct conversion may provide the highest quality signal output, and may accordingly select a local oscillation frequency in order to perform direct conversion (i.e., a local oscillator frequency that matches the carrier frequency of the wanted signal). Wireless receiver 1200 may therefore switch from low-IF reception to direct conversion. The quality of the output wanted signal may accordingly be improved, as any present frequency spur may contribute very little interference.

Local oscillator selection circuit 1110 may therefore select whether to switch from low-IF reception to direct conversion based on an analysis of a frequency band containing spurious interference according to Equation 2. Local oscillator selection circuit 1110 may additionally consider the potential interference caused by image frequencies in low-IF reception by analyzing the signals provided by low channel BPF 1102 and high channel BPF 1104.

For example, wireless receiver 1200 may be performing low-IF reception. Wireless receiver 1200 may utilize frequency analysis circuit 1300 to analyze the potential impact of spurious interference if wireless receiver 1200 switched to direct conversion from low-IF reception. As detailed above, the passband of wanted channel BPF 1314 may be adjusted to measure the interference level of a frequency spur. Local oscillator selection circuit 1110 may also consider the image frequency band power by analyzing the signals provided by low channel RSSI measurement circuit 1106 and high channel RSSI measurement circuit 1108. For example, local oscillator selection circuit 1110 may identify which of low-side low-IF, high-side low-IF, or direct conversion would result in the least interference of the wanted signal. In other words, local oscillator selection circuit 1110 may analyze the signals provided by low channel RSSI measurement circuit 1106, high channel RSSI measurement circuit 1108, and RSSI/spur detection circuit 1316 in order to determine which local oscillation frequency will result in minimal interference.

For example, wireless receiver 1200 may be performing low-IF reception with a local oscillation frequency selected by local oscillator selection circuit 1110 that selects the low channel as the image frequency. However, local oscillator selection 1110 may determine that a frequency spur, located according to Equation 2, will provide a lesser level of interference than the low image frequency channel. Local oscillator selection circuit 1110 may then switch from low-IF to direct conversion. While the wanted signal may accordingly suffer from interference caused by a frequency spur, the overall level of distortion at the output may be less than the interference caused by the low image frequency channel (as estimated by local oscillator selection circuit 1110). Accordingly, the quality of the demodulated wanted signal at the output may be improved.

Local oscillator selection circuit 1110 may alternatively determine that the high image frequency channel will yield even less interference than the spur frequency. Accordingly, local oscillator selection circuit 1110 may select the local oscillator frequency that selects the high channel as the image frequency.

Numerous such scenarios are possible. For example, wireless receiver 1200 may be performing direct conversion, and accordingly a frequency spur may be located within the wanted signal frequency band. Wanted channel BPF 1314 may then select the wanted channel frequency band as the passband, and consequently RSSI/spur detection circuit 1316 may similarly provide local oscillator selection circuit 1110 with an indicator of the severity of interference caused by a frequency spur. Low channel BPF 1102 and high channel BPF 1104 may similarly filter the high and low image frequency bands, as previously detailed. RSSI measurement circuits 1106 and 1108 may additionally provide local oscillator selection circuit 1110 with indicators of the severity of interference caused by the low and high image frequency channels, respectively. Local oscillator selection circuit 1110 may then select to either continue with direct conversion or to switch to low-side or high-side low-IF based on the received input signals. Local oscillator selection circuit 1110 may select between direct conversion or low-side/high-side low-IF based on which option will result in minimal interference of wanted signal at the output.

The above-described implementations may additionally function according to numerous other configurations as previously disclosed. For example, local oscillator selection circuit 1110 may make use of averaging, thresholding, or external inputs such as receive signal quality indicator 1112 to determine whether to select either direct conversion, low-side low-IF, or high-side low-IF. For example, local oscillator selection circuit 1110 may average on or more of the inputs received from RSSI measurement circuits 1106 and 1108 and RSSI/spur detection circuit 1316. Local oscillator selection circuit 1110 may alternatively be configured to use thresholds in determining whether a switch from direct conversion to low-IF, or from low-IF to direct conversion, is warranted. Local oscillator selection circuit 1110 may additionally be configure to use receive signal quality indicator 1112 to determine whether a switch from reception techniques should be made.

As previously detailed, wireless receiver 1200 may operate on an LTE or LTE-A network. Wireless receiver 1200 may implement LTE carrier aggregation in order to receive two or more data streams simultaneously on separate RF carrier frequencies. For example, wireless receiver 1200 may utilize local oscillators 1210 and 1212 to tune to separate RF carrier frequencies in order to receive and demodulate data streams contained thereon.

Wireless receiver 1200 may therefore include a receiver such as preprocessor 1204 to receive a first signal being modulated on a first carrier frequency. Wireless receiver 1200 may also include image frequency analysis circuit 1218, which includes low channel BPF 1102 and RSSI measurement circuit 1106, wanted channel BPF 1314 and RSSI/spur detection circuit 1316, and high channel BPF 1104 and RSSI measurement circuit 1108. Wireless receiver 1200 may also include local oscillator selection circuit 1110.

A first circuit (high channel BPF 1104 and RSSI measurement circuit 1108) of wireless receiver 1200 may be configured to measure a signal level of a received second signal at a frequency being higher than the first carrier frequency. A second circuit (low channel BPF 1102 and RSSI measurement circuit 1106) may be configure to measure a signal level of a received third signal at a frequency being lower than the first carrier frequency.

Wireless receiver 1200 may include a selector (local oscillator selection circuit 1110), which may be configured to select an intermediate mixing carrier frequency from a plurality of intermediate mixing carrier frequencies for processing at least a portion of the received first signal based on the signal level of the second signal and the signal level of the third signal. A first intermediate mixing carrier frequency of the plurality of intermediate mixing carrier frequencies may be above a predefined frequency band. A second intermediate mixing carrier frequency of the plurality of intermediate mixing carrier frequencies may be below the predefined frequency band.

Wireless receiver 1200 may further include a third circuit (mixer 1206, local oscillator 1210, and post-processor 1214) configured to perform intermediate frequency reception of at least a portion of the received first signal using the selected intermediate mixing carrier frequency.

Local oscillator selection circuit 1110 may be configured to select the intermediate mixing carrier frequency from the plurality of intermediate mixing carrier frequencies based on a comparison between the signal level of the received second signal and the signal level of the received third signal.

Local oscillator selection circuit 1110 may be configured to select the first intermediate mixing carrier frequency in the case that the signal level of the received second signal is less than the signal level of the received third signal. Local oscillator selection circuit 1110 may additionally be configured to select the second intermediate mixing carrier frequency in the case that the signal level of the received second signal is greater than the signal level of the received third signal The first circuit (high channel BPF 1104 and RSSI measurement circuit 1108) may be configured to measure a further signal level of the received second signal. The second circuit (low channel BPF 1102 and RSSI measurement circuit 1106) may be configured to measure a further signal level of the received third signal. The first and second circuits may measure the further signal levels after the third circuit performs intermediate frequency reception of at least a portion of the received first signal using the selected intermediate mixing carrier frequency. Local oscillator selection circuit 1110 may be configured to select a different intermediate mixing carrier frequency from the plurality of intermediate mixing carrier frequencies based on the measured further signal level of the received second signal and the measured further signal level of the received third signal. The third circuit (mixer 1206, local oscillator 1210, and post-processor 1214) may be configured to perform intermediate frequency reception of at least a portion of the received first signal using the different intermediate mixing carrier frequency.

Local oscillator selection circuit 1110 may be configured to select the different intermediate mixing carrier frequency only if the difference between further signal level of the received second signal and the further signal level of the received third signal is greater than a predefined threshold.

The third circuit may also be configured to generate an output signal by performing intermediate frequency reception of at least a portion of the received first signal using the selected intermediate mixing carrier frequency. Local oscillator selection circuit 1110 may be configured to select the different intermediate mixing carrier frequency from the plurality of intermediate mixing carrier frequencies only if a signal quality of the output signal satisfies a predefined criterion.

The first circuit may be configured to measure the further signal level of the received second signal by measuring an average signal level of the received second signal. Similarly, the the second circuit may be configured to measure the further signal level of the received third signal by measuring an average signal level of the received third signal. Wireless receiver 1200 may include a fourth circuit (wanted channel BPF 1104 and RSSI/spur detection circuit 1316) configured to measure a signal level of a fourth signal located in the predefined frequency, i.e. to measure for the presence of a spur in the wanted channel frequency band.

Local oscillator selection circuit 1110 may be configured to select a first intermediate mixing carrier frequency, a second intermediate mixing carrier frequency, or a third intermediate mixing carrier frequency from the plurality of intermediate mixing carrier frequencies. The third intermediate mixing carrier frequency may be equal to the first carrier frequency, i.e. will result in direct conversion. In contrast, the first and second intermediate mixing carrier frequencies may be different than the first carrier frequency, and may result in low-IF reception.

Local oscillator selection circuit 1110 may be configured to select the first intermediate mixing carrier frequency in the case that the second signal level is less than the third signal level, and to select the second intermediate mixing carrier frequency in the case that the second signal level is greater than the third signal level.

Local oscillator selection circuit 1110 may be configured to select either the first intermediate mixing carrier frequency or the second intermediate mixing carrier frequency in the case that the measured signal level of the fourth signal indicates that spurious interference is present in a selected frequency band, wherein the selected frequency band is identified as potentially containing spurious interference. The selected frequency band may be substantially the same as the predefined frequency band, as in the case where direct conversion is being performed. Alternatively, the selected frequency band may be identified as a frequency band other than the predefined frequency band that may contain spurious interference. Alternatively, local oscillator selection circuit 1110 may be configured to select the third intermediate mixing carrier frequency in the case that the measured signal level indicates that the selected frequency band is substantially free of spurious interference.

After the third circuit (mixer 1206, local oscillator 1210, and post-processor 1214) performs intermediate frequency reception of at least a portion of the received first signal using the selected intermediate mixing carrier frequency, the first circuit (high channel BPF 1104 and RSSI measurement circuit 1108) may be configured to measure a further signal level of the received second signal. Similarly, the second circuit (low channel BPF 1102 and RSSI measurement circuit 1106) may be configured to measure a further signal level of the received third signal. The fourth circuit (wanted channel BPF 1104 and RSSI/spur detection circuit 1316) may be similarly configured to measure a further signal level of the received fourth signal. Local oscillator selection circuit 1110 may be configured to select a different intermediate mixing carrier frequency from the plurality of intermediate mixing carrier frequencies based on the measured further signal level of the received second signal, the measured further signal level of the received third signal, and the measured further signal level of the received fourth signal. The third circuit may then be configured to perform intermediate frequency reception of at least a portion of the received first signal using the different intermediate mixing carrier frequency.

Local oscillator selection circuit 1110 may be configured to select either the first intermediate mixing carrier frequency or the second intermediate mixing carrier frequency as the different intermediate mixing carrier frequency based on a comparison between the measured further signal level of the received second signal and the measured further signal level of the received third signal. Local oscillator selection circuit 1110 may be configured to select the first intermediate mixing carrier frequency as the different intermediate mixing carrier frequency if the measured further signal level of the received second signal is less than the measured further signal level of the received third signal. Local oscillator selection circuit 1110 may alternatively be configured to select the first intermediate mixing carrier frequency as the different intermediate mixing carrier frequency if the measured further signal level of the received second signal is less than the measured further signal level of the received third signal by a predefined amount.

Similarly, local oscillator selection circuit 1110 may be configured to select the second intermediate mixing carrier frequency as the different intermediate mixing carrier frequency if the measured further signal level of the received second signal is greater than the measured further signal level of the received third signal. Local oscillator selection circuit 1110 may be configured to select the second intermediate mixing carrier frequency as the different intermediate mixing carrier frequency if the measured further signal level of the received second signal is greater than the measured further signal level of the received third signal by a predefined amount.

Local oscillator selection circuit 1110 may be configured to select the third intermediate mixing carrier frequency as the different intermediate mixing carrier frequency in the case that the further signal level of the received fourth signal indicates that the selected frequency band is substantially free of spurious interference.

Wireless receiver 1200 may additionally include a fifth circuit (mixer 1208, local oscillator 1212, and post-processor 1216) configured to processed at least a portion of a received fifth signal at the same time as the portion of the received first signal.

The received first signal received by wireless receiver 1200 may be a first wanted signal being frequency mixed to the first carrier frequency. The fifth signal received by wireless receiver 1200 may be a second wanted signal being frequency mixed to a second carrier frequency different from the first carrier frequency.

The first intermediate mixing carrier frequency and the second intermediate carrier frequency may be specifically selected such the predefined frequency band is substantially free of spurious interference in the case that the intermediate frequency reception of at least a portion of the received first signal is performed using the first intermediate mixing carrier frequency or the second intermediate mixing carrier frequency.

RSSI measurement circuit 1108 may perform a received signal strength indication measurement as a part of measuring the signal level of the received second signal. The received signal strength indication measurement may be a wideband received signal strength indication measurement.

Similarly, RSSI measurement circuit 1106 may perform a received signal strength indication measurement as a part of measuring the signal level of the received third signal. The received signal strength indication measurement may be a wideband received signal strength indication measurement.

Wireless receiver 1200 may be configured to process the first signal in accordance with UMTS. Alternatively, wireless receiver 1200 may be configured to process the first signal in accordance with LTE or LTE-A.

Post-processors 1214 and 1216 may be configured to carry out a carrier aggregation using the received first signal.

The received first signal may be a mobile radio signal.

Wireless receiver 1200 may also be configured to process the intermediate frequency signal, such as e.g. with post-processor 1214 and/or post-processor 1216

Figure 14:
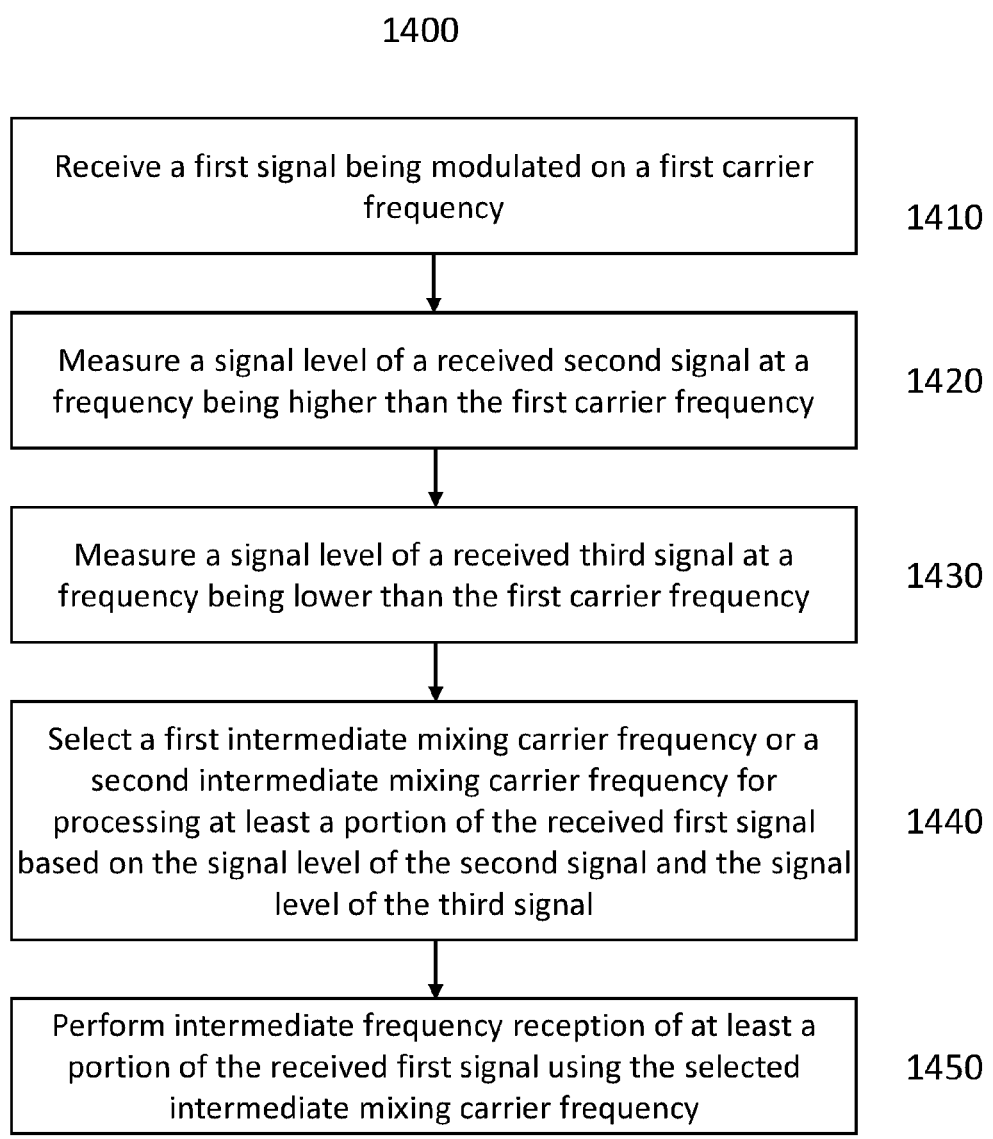
FIG. 14 shows a flowchart illustrating a method of processing signals.

FIG. 14 shows a flow diagram 1400 illustrating a method of performing intermediate frequency reception of received wireless signals.

Process 1400 may include receiving a first signal modulated on a first carrier frequency located in a predefined frequency band 1410. Process 1400 may further include measuring a signal level of a received second signal at a frequency being higher than the first carrier frequency 1420, and measuring a signal level of a received third signal at a frequency being lower than the first carrier frequency 1430.

Process 1400 may additionally include selecting an intermediate mixing carrier frequency from a plurality of intermediate mixing carrier frequencies for processing at least a portion of the received first signal based on the signal level of the second signal and the signal level of the third signal 1440. A first intermediate mixing carrier frequency of the plurality of intermediate mixing carrier frequencies may be above a predefined frequency band and a second intermediate mixing carrier frequency of the plurality of intermediate mixing carrier frequencies may be below the predefined frequency band.

Process 1400 may further include performing intermediate frequency reception of at least a portion of the received first signal using the selected intermediate mixing carrier frequency 1450.

Process 1400 may additionally include selecting the intermediate mixing carrier frequency from the plurality of intermediate mixing carrier frequencies based on a comparison between the signal level of the received second signal and the signal level of the received third signal. Process 1400 may select the first intermediate mixing carrier frequency in the case that the signal level of the received second signal is less than the signal level of the received third signal. Process 1400 may alternatively select the second intermediate mixing carrier frequency in the case that the signal level of the received second signal is greater than the signal level of the received third signal.

Process 1400 may further include measuring a further signal level of the received second signal and measuring a further signal level of the received third signal. Process 1400 may measure the further signal levels after performing intermediate frequency reception of at least a portion of the received first signal using the selected intermediate mixing carrier frequency. Process 1400 may then select a different intermediate mixing carrier frequency from the plurality of intermediate mixing carrier frequencies based on the measured further signal level of the received second signal and the measured further signal level of the received third signal. Process 1400 may perform intermediate frequency reception of at least a portion of the received first signal using the different intermediate mixing carrier frequency.

Process 1400 may select a different intermediate mixing carrier frequency from the plurality of intermediate mixing carrier frequencies only if the difference between the further signal level of the received second signal and the further signal level of the received third signal is greater than a predefined threshold.

Process 1400 may also generate an output signal by performing intermediate frequency reception of at least a portion of the received first signal using the selected intermediate mixing carrier frequency. Process 1400 may select a different intermediate mixing carrier frequency from the plurality of intermediate mixing carrier frequencies only if a signal quality of the output signal satisfies a predefined criterion.

Process 1400 may also measure an average signal level of the received second signal and measuring an average signal level of the received third signal in order to measure the further signal level of the received second signal and the further signal level of the received third signal.

Process 1400 may additionally measure a signal level of a fourth signal located in a selected frequency band, wherein the selected frequency band is identified as potentially containing spurious interference. Selecting the first intermediate mixing carrier frequency or the second intermediate carrier frequency in 1440 may include selecting one of the first intermediate mixing carrier frequency, the second intermediate mixing carrier frequency, or a third intermediate mixing carrier frequency. The third intermediate mixing carrier frequency may be equal to the first carrier frequency.

Process 1400 may select the first intermediate mixing carrier frequency in the case that the second signal level is less than the third signal level. Alternatively, process 1400 may select the second intermediate mixing carrier frequency in the case that the second signal level is greater than the third signal level.

Process 1400 may select either the first intermediate mixing carrier frequency or the second intermediate mixing carrier frequency in the case that the measured signal level of the fourth signal indicates that spurious interference is present in the selected frequency band.

Alternatively, process 1400 may select the third intermediate mixing carrier frequency in the case that the measured signal level indicates that the selected frequency band is substantially free of spurious interference.

Process 1400 may further include measuring a further signal level of the received second signal, measuring a further signal level of the received third signal, and measuring a further signal level of the received fourth signal. Process 1400 may measure the further signal levels after performing intermediate frequency reception of at least a portion of the received first signal using the selected intermediate mixing carrier frequency. Process 1400 may select selecting a different intermediate mixing carrier frequency from the plurality of intermediate mixing carrier frequencies based on the measured further signal level of the received second signal, the measured further signal level of the received third signal, and the measured further signal level of the received fourth signal, and may perform intermediate frequency reception of at least a portion of the received first signal using the different intermediate mixing carrier frequency.

Process 1400 may select either the first intermediate mixing carrier frequency or the second intermediate mixing carrier frequency as the different intermediate mixing carrier frequency based on a comparison between the measured further signal level of the received second signal and the measured further signal level of the received third signal. Process 1400 may select the first intermediate mixing carrier frequency as the different intermediate mixing carrier frequency if the measured further signal level of the received second signal is less than the measured further signal level of the received third signal. Process 1400 may alternatively select the first intermediate mixing carrier frequency as the different intermediate mixing carrier frequency if the measured further signal level of the received second signal is less than the measured further signal level of the received third signal by a predefined amount.

Process 1400 may also select the second intermediate mixing carrier frequency as the different intermediate mixing carrier frequency if the measured further signal level of the received second signal is greater than the measured further signal level of the received third signal. Process 1400 may select the second intermediate mixing carrier frequency as the different intermediate mixing carrier frequency if the measured further signal level of the received second signal is greater than the measured further signal level of the received third signal by a predefined amount.

Process 1400 may select the third intermediate mixing carrier frequency as the different intermediate mixing carrier frequency in the case that the further signal level of the received fourth signal indicates that the selected frequency band is substantially free of spurious interference.

Process 1400 may further include receiving a fifth signal, and processing at least a portion of the received fifth signal at the same time as a portion of the received first signal. The received first signal may be a first wanted signal being frequency mixed to the first carrier frequency for wireless transmission. The received fifth signal may be a second wanted signal being frequency mixed to a different carrier frequency from the first carrier frequency.

The first intermediate mixing carrier frequency and/or the second intermediate mixing carrier frequency may be specifically selected such that the predefined frequency band is substantially free of spurious interference in the case that the intermediate frequency reception of at least a portion of the received first signal is performed using the first intermediate mixing carrier frequency or the second intermediate mixing carrier frequency. 1420 may measure the signal level of the received second signal at least in part by performing a received signal strength indication measurement. Similarly, 1430 may perform a received signal strength indication measurement in order to measure the signal level of the second signal. Alternatively, 1420 and/or 1430 may perform wideband signal strength indication measurements in order to measure the signal level of the first and second signal, respectively.

Process 1400 may process the first signal in accordance with UMTS. Alternatively, process 1400 may process the second signal in accordance with LTE or LTE-A.

Process 1400 may additionally include performing a carrier aggregation process using the received first signal. For example, the received first signal may be transmitted on one of a plurality of carrier channels being used for a carrier aggregation process. The received first signal may be a mobile radio signal.

Figure 15:
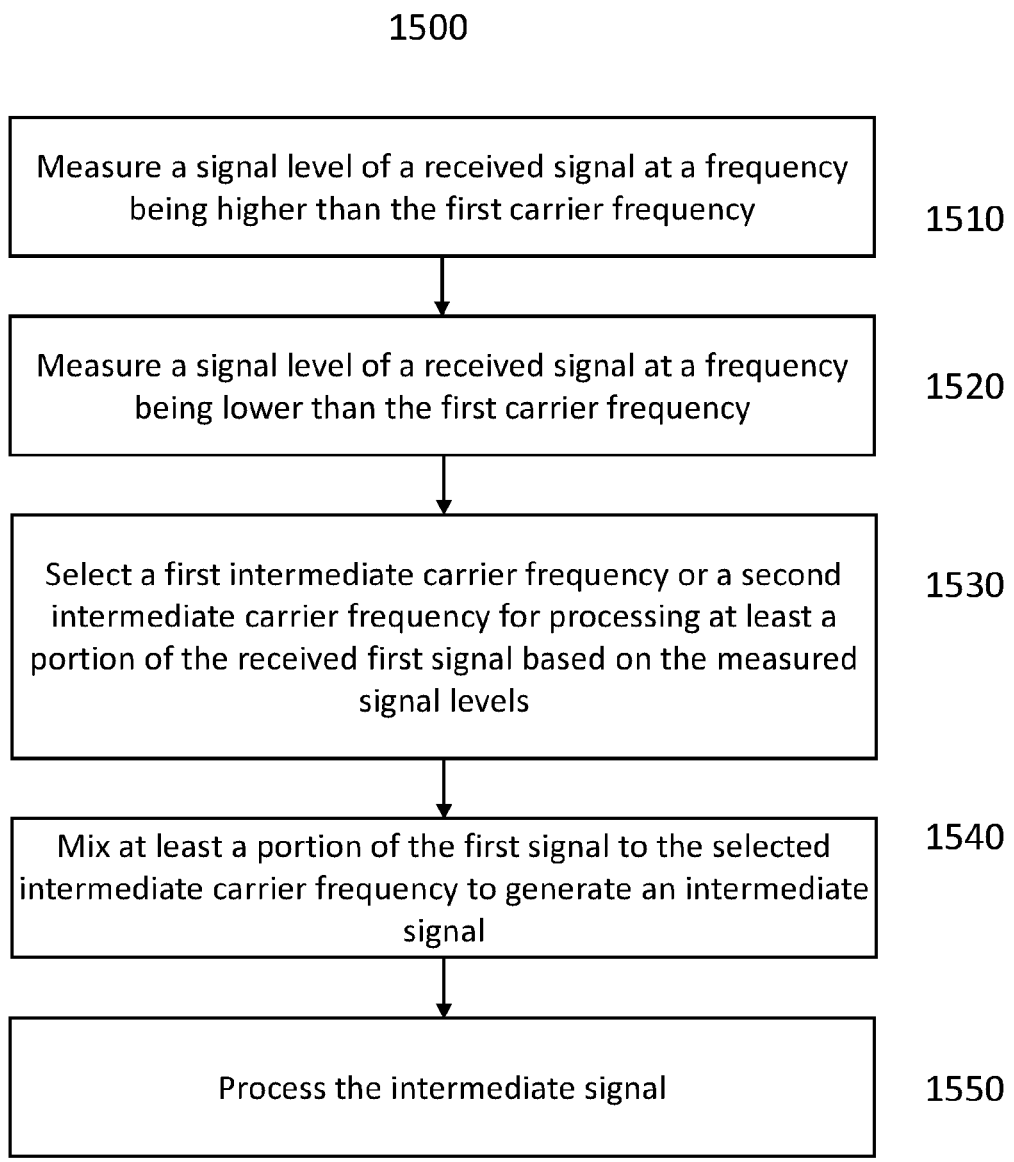
FIG. 15 shows a flowchart illustrating a method of processing a received first signal being modulated on a first carrier frequency.

FIG. 15 shows a flowchart 1500 illustrating a method of processing a received first signal being modulated on a first carrier frequency.

Process 1500 may include measuring a signal level of a received signal at a frequency being higher than the first carrier signal 1510. Process 1500 may further include measuring a signal level of a received signal being lower than the first carrier frequency 1520.

In 1530, process 1500 may select an intermediate mixing carrier frequency from a plurality of intermediate mixing carrier frequencies for processing at least a portion of the received first signal based on the measured signal levels. A first intermediate carrier frequency of the plurality of intermediate mixing carrier frequencies may be above a predefined frequency band. A second intermediate carrier frequency of the plurality of intermediate mixing carrier frequencies may be below the predefined frequency band.

In 1540, process 1500 may mix at least a portion of the first signal to the selected intermediate carrier frequency to generate an intermediate signal.

Process 1500 may further process the intermediate signal 1550.

Process 1500 may select the intermediate mixing carrier frequency from the plurality of intermediate mixing carrier frequencies based on a comparison between the signal level of the received signal at a frequency being higher than the first carrier frequency and the signal level of the received signal at a frequency being lower than the first carrier frequency.

Process 1500 may select the first intermediate mixing carrier frequency in the case that the signal level of the received signal being at a higher frequency is less than the signal level of the received signal being at a lower frequency. Alternatively, process 1500 may select the second intermediate mixing carrier frequency in the case that the signal level of the received signal being at a higher frequency is greater than the signal level of the received signal being at a lower frequency.

Process 1500 may further include measuring a further signal level of the received signal being at a higher frequency and measuring a further signal level of the received signal being at a lower frequency, wherein the further signal levels are measured after mixing at least the portion of the first signal to the selected intermediate carrier frequency to generate an intermediate signal. Process 1500 may then select a different intermediate mixing carrier frequency from the plurality of intermediate mixing carrier frequencies based on the measured further signal level of the received signal being at a higher frequency and the measured further signal level of the third signal being at a lower frequency. Process 1500 may then mix at least a portion of the first signal to the different intermediate carrier frequency to generate an intermediate signal.

Process 1500 may select the different intermediate mixing carrier frequency from the plurality of intermediate mixing carrier frequencies only if the difference between further signal level of the received signal at a higher frequency and the further signal level of the received signal at a lower frequency is greater than a predefined threshold.

Process 1500 may additionally generate an output signal by processing the intermediate signal. Process 1500 may select the different intermediate mixing carrier frequency from the plurality of intermediate mixing carrier frequencies only if a signal quality of the output signal satisfies a predefined criterion.

Process 1500 may measure the further signal level of the received signal being at a higher frequency by measuring an average signal level of the received signal being at a higher frequency. Process 1500 may additionally measure the further signal level of the received signal being at a lower frequency by measuring an average signal level of the received signal being at a lower frequency.

Process 1500 further include measuring a signal level of a second signal located in a selected frequency band. Process 1500 may then select an intermediate mixing carrier frequency from a plurality of intermediate mixing carrier frequencies by selecting one of the first intermediate carrier frequency or the second intermediate carrier frequency or a third intermediate carrier frequency as the intermediate carrier frequency, wherein the third intermediate carrier frequency is equal to the first carrier frequency.

Process 1500 may select the first intermediate mixing carrier frequency in the case that the signal level of the received signal being at a higher frequency is less than the signal level of the received signal being at a lower frequency. Alternatively, process 1500 may select the second intermediate mixing carrier frequency in the case that the signal level of the received signal being at a higher frequency is greater than the signal level of the received signal being at a lower frequency.

Process 1500 may select either the first intermediate mixing carrier frequency or the second intermediate mixing carrier frequency in the case that the measured signal level of the second signal in the selected frequency band indicates that spurious interference is present in the selected frequency band.

Alternatively, process 1500 may select the third intermediate mixing carrier frequency in the case that the measured signal level of the second signal in the selected frequency band indicates that the selected frequency band is substantially free of spurious interference.

Process 1500 may further include measuring a further signal level of the received signal being at a higher frequency, measuring a further signal level of the received signal being at a lower frequency, and measuring a further signal level of the received second signal in the selected frequency band, wherein the further signal levels are measured after mixing at least the portion of the first signal to the selected intermediate carrier frequency to generate an intermediate signal. Process 1500 may then select a different intermediate mixing carrier frequency from the plurality of intermediate mixing carrier frequencies based on the measured further signal level of the received signal being at a higher frequency, the measured further signal level of the received signal being at a lower frequency, and the measured further signal level of the received second signal in the selected frequency band. Process 1500 may then mix at least a portion of the first signal to the different intermediate mixing carrier frequency to generate an intermediate signal.

Process 1500 may select either the first intermediate mixing carrier frequency or the second intermediate mixing carrier frequency as the different intermediate mixing carrier frequency based on a comparison between the measured further signal level of the received signal being at a higher frequency and the measured further signal level of the received signal being at a lower frequency.

Process 1500 may select the first intermediate mixing carrier frequency as the different intermediate mixing carrier frequency if the measured further signal level of the received signal being at a higher frequency is less than the measured further signal level of the received signal being at a lower frequency. Additionally, process 1500 may select the first intermediate mixing carrier frequency as the different intermediate mixing carrier frequency if the measured further signal level of the received signal being at a higher frequency is less than the measured further signal level of the received signal being at a lower frequency by a predefined amount.

Alternatively, process 1500 may select the second intermediate mixing carrier frequency as the different intermediate mixing carrier frequency if the measured further signal level of the received signal being at a higher frequency is greater than the measured further signal level of the received signal being at a lower frequency. Process 1500 may select the second intermediate mixing carrier frequency as the different intermediate mixing carrier frequency if the measured further signal level of the received signal being at a higher frequency is greater than the measured further signal level of the received signal being at a lower frequency by a predefined amount.

Process 1500 may select the third intermediate mixing carrier frequency as the different intermediate mixing carrier frequency in the case that the further signal level of the received second signal in the selected frequency band indicates that the selected frequency band is substantially free of spurious interference.

Process 1500 may additionally receive a further signal, and process at least a portion of the further signal at the same time as the portion of the received first signal.

The received first signal may be a first wanted signal being frequency mixed to the first carrier frequency for wireless transmission. The received further signal may be a second wanted signal being frequency mixed to a different carrier frequency from the first carrier frequency.

The first intermediate carrier frequency and the second intermediate carrier frequency may be specifically selected such that the predefined frequency band is substantially free of spurious interference in the case that the intermediate signal is processed using the first intermediate carrier frequency or the second intermediate carrier frequency. In 1510, process 1500 may measure the signal level of the received signal at a frequency being higher than the first carrier frequency at least in part by performing a received signal strength measurement. Alternatively, 1510 may measure the signal level of the received signal at a frequency being higher than the first carrier frequency at least in part by performing a wideband received signal strength measurement.

Similarly, 1520 may measure the signal level of the received signal at a frequency being lower than the first carrier frequency at least in part by performing a received signal strength measurement. 1520 may alternatively measure the signal level of the received signal at a frequency being lower than the first carrier frequency at least in part by performing a wideband received signal strength measurement.

Process 1500 may process the first signal in accordance with UMTS. Alternatively, process 1500 may process the first signal in accordance with LTE or LTE-A.

Process 1500 may further include carrying out a carrier aggregation process using the received first signal. The received first signal may be a mobile radio signal.

The following examples pertain to further aspects of this disclosure:

Example 1 is a method of processing signals. The method includes receiving a first signal at a first carrier frequency located in a predefined frequency band. The method further includes measuring a signal level of a received second signal at a higher frequency than the first carrier frequency and measuring a signal level of a received third signal at a lower frequency than the first carrier frequency. The method further includes selecting an intermediate mixing carrier frequency from a plurality of intermediate mixing carrier frequencies for processing at least a portion of the received first signal based on the signal level of the received second signal and the signal level of the received third signal, and performing intermediate frequency reception of at least a portion of the received first signal using the selected intermediate mixing carrier frequency.

In Example 2, the subject matter of Example 1 can optionally include wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the intermediate mixing carrier frequency is selected from the plurality of intermediate mixing carrier frequencies by comparing the signal level of the received second signal and the signal level of the received third signal.

In Example 3, the subject matter of Example 2 can optionally further include wherein the selecting the intermediate mixing carrier frequency from the plurality of intermediate mixing carrier frequencies includes selecting the first intermediate mixing carrier frequency if the signal level of the received second signal is less than the signal level of the received third signal, and selecting the second intermediate mixing carrier frequency if the signal level of the received second signal is greater than the signal level of the received third signal.

In Example 4, the subject matter of Examples 1-3 can further include measuring a further signal level of the received second signal and measuring a further signal level of the received third signal. Example 4 further includes wherein the further signal levels are measured after performing intermediate frequency reception of at least a portion of the received first signal using the selected intermediate mixing carrier frequency. Example 4 further includes selecting a different intermediate mixing carrier frequency from the plurality of intermediate mixing carrier frequencies based on the measured further signal level of the received second signal and the measured further signal level of the received third signal, and performing intermediate frequency reception of at least a portion of the received first signal using the different intermediate mixing carrier frequency.

In Example 5, the subject matter of Example 4 can further include wherein the selecting a different intermediate mixing carrier frequency includes selecting the different intermediate mixing carrier frequency from the plurality of intermediate mixing carrier frequencies if the difference between the further signal level of the received second signal and the further signal level of the received third signal is greater than a predefined threshold.

In Example 6, the subject matter of Example 4 can further include generating an output signal by performing intermediate frequency reception of at least a portion of the received first signal using the selected intermediate mixing carrier frequency, and wherein the selecting the different intermediate mixing carrier frequency includes selecting the different intermediate mixing carrier frequency from the plurality of intermediate mixing carrier frequencies if a signal quality of the output signal satisfies a predefined criterion.

In Example 7, the subject matter of Example 4 can further include wherein the measuring the further signal level of the received second signal and the further signal level of the received third signal includes measuring an average signal level of the received second signal and measuring an average signal level of the received third signal.

In Example 8, the subject matter of Examples 2 to 7 can further include measuring a signal level of a fourth signal located in a selected frequency band, wherein the selected frequency band is identified as potentially containing spurious interference, wherein the selecting an intermediate mixing carrier frequency from the plurality of intermediate mixing carrier frequencies includes selecting one of the first intermediate mixing carrier frequency or the second intermediate mixing carrier frequency or a third intermediate mixing carrier frequency as the intermediate mixing carrier frequency, wherein the third intermediate mixing carrier frequency is equal to the first carrier frequency.

In Example 9, the subject matter of Example 8 can further include wherein the selecting an intermediate mixing carrier frequency from the plurality of intermediate mixing carrier frequencies includes selecting the first intermediate mixing carrier frequency if the second signal level is less than the third signal level, and selecting the second intermediate mixing carrier frequency if the second signal level is greater than the third signal level.

In Example 10, the subject matter of Example 9 can optionally further include wherein the selecting an intermediate mixing carrier frequency includes selecting either the first intermediate mixing carrier frequency or the second intermediate mixing carrier frequency if the measured signal level of the fourth signal indicates that spurious interference is present in the selected frequency band.

In Example 11, the subject matter of Example 10 can optionally further include wherein the selecting an intermediate mixing carrier frequency includes selecting the third intermediate mixing carrier frequency if the measured signal level indicates that the selected frequency band is substantially free of spurious interference.

In Example 12, the subject matter of Example 8 can optionally further include measuring a further signal level of the received second signal, measuring a further signal level of the received third signal, and measuring a further signal level of the received fourth signal. Example 12 further includes wherein the further signal levels are measured after performing intermediate frequency reception of at least a portion of the received first signal using the selected intermediate mixing carrier frequency. Example 12 further includes selecting a different intermediate mixing carrier frequency from the plurality of intermediate mixing carrier frequencies based on the measured further signal level of the received second signal, the measured further signal level of the received third signal, and the measured further signal level of the received fourth signal, and performing intermediate frequency reception of at least a portion of the received first signal using the different intermediate mixing carrier frequency.

In Example 13, the subject matter of Example 12 can further include wherein the selecting a different intermediate mixing carrier frequency includes selecting either the first intermediate mixing carrier frequency or the second intermediate mixing carrier frequency as the different intermediate mixing carrier frequency by comparing the measured further signal level of the received second signal and the measured further signal level of the received third signal.

In Example 14, the subject matter of Example 12 can further include wherein the selecting a different intermediate mixing carrier frequency includes selecting the first intermediate mixing carrier frequency as the different intermediate mixing carrier frequency if the measured further signal level of the received second signal is less than the measured further signal level of the received third signal.

In Example 15, the subject matter of Example 12 can further include wherein the selecting a different intermediate mixing carrier frequency includes selecting the first intermediate mixing carrier frequency as the different intermediate mixing carrier frequency if the measured further signal level of the received second signal is less than the measured further signal level of the received third signal by a predefined amount In Example 16, the subject matter of Example 13 can further include wherein the selecting a different intermediate mixing carrier frequency includes selecting the second intermediate mixing carrier frequency as the different intermediate mixing carrier frequency if the measured further signal level of the received second signal is greater than the measured further signal level of the received third signal.

In Example 17, the subject matter of Example 16 can further include wherein the selecting a different intermediate mixing carrier frequency includes selecting the second intermediate mixing carrier frequency as the different intermediate mixing carrier frequency if the measured further signal level of the received second signal is greater than the measured further signal level of the received third signal by a predefined amount.

In Example 18, the subject matter of Example 12 can optionally further include wherein the selecting a different intermediate mixing carrier frequency includes selecting the second intermediate mixing carrier frequency as the different intermediate mixing carrier frequency if the measured further signal level of the received second signal is greater than the measured further signal level of the received third signal by a predefined amount.

In Example 19, the subject matter of Examples 1 18 can further include receiving a fifth signal and processing at least a portion of the received fifth signal at the same time as the portion of the received first signal.

In Example 20, the subject matter of Examples 1 to 19 can further include wherein the received first signal is a first wanted signal that is modulated to the first carrier frequency for wireless transmission.

In Example 21, the subject matter of Examples 19 or 20 can further include wherein the received fifth signal is a second wanted signal that is modulated to a different carrier frequency from the first carrier frequency.

In Example 22, the subject matter of Examples 1 to 21 can further include wherein the selecting the selected intermediate mixing carrier frequency includes selecting the selected intermediate mixing carrier frequency such that the predefined frequency band is substantially free of spurious interference in the case that the intermediate frequency reception of at least a portion of the received first signal is performed using the selected intermediate mixing carrier frequency.

In Example 23, the subject matter of Examples 1 to 22 can optionally include wherein the measuring the signal level of the received second signal includes a received signal strength indication measurement.

In Example 24, the subject matter of Example 23 can optionally include wherein the measuring the signal level of the received second signal includes a wideband received signal strength indication measurement.

In Example 25, the subject matter of Examples 1 to 23 can optionally include wherein the measuring the signal level of the received third signal includes a received signal strength indication measurement.

In Example 26, the subject matter of Example 25 can optionally include wherein measuring the signal level of the received third signal includes a wideband received signal strength indication measurement.

In Example 27, the subject matter of Examples 1 to 26 can optionally include wherein the first signal is processed in accordance with Universal Mobile Telecommunications System (UMTS).

In Example 28, the subject matter of Examples 1 to 27 can optionally include where wherein the first signal is processed in accordance with Long Term Evolution (LTE).

In Example 29, the subject matter of Examples 1 to 28 can optionally include wherein the first signal is processed in accordance with Long Term Evolution Advanced (LTE-A).

In Example 30, the subject matter of Examples 1 to 29 can further include performing a carrier aggregation using the received first signal.

In Example 31, the subject matter of Examples 1 to 30 can optionally include wherein the received first signal is a mobile radio signal.

Example 32 is a method of processing a received first signal at a first carrier frequency located in a predefined frequency band. Example 32 further includes measuring a signal level of a received signal at a higher frequency than the first carrier frequency and measuring a signal level of a received signal at a lower frequency than the first carrier frequency. Example 32 further includes selecting an intermediate mixing carrier frequency from a plurality of intermediate mixing carrier frequencies for processing at least a portion of the received first signal based on the measured signal levels. Example 32 further includes mixing at least a portion of the first signal to the selected intermediate carrier frequency to generate an intermediate signal and processing the intermediate signal.

In Example 33, the subject matter of Example 32 can optionally include wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selecting an intermediate mixing carrier frequency from a plurality of intermediate mixing carrier frequencies includes selecting the intermediate mixing carrier frequency by comparing the signal level of the received signal at a higher frequency than the first carrier frequency and the signal level of the received signal at a lower frequency than the first carrier frequency.

In Example 34, the subject matter of Example 33 can optionally include wherein the selecting the intermediate mixing carrier frequency includes selecting the first intermediate mixing carrier frequency if the signal level of the received signal at a higher frequency is less than the signal level of the received signal at a lower frequency and selecting the second intermediate mixing carrier frequency if the signal level of the received signal a higher frequency is greater than the signal level of the received signal at a lower frequency.

In Example 35, the subject matter of Example 33 can further include measuring a further signal level of the received signal at a higher frequency and measuring a further signal level of the received signal at a lower frequency. Example 35 further includes wherein the further signal levels are measured after mixing at least the portion of the first signal to the selected intermediate carrier frequency to generate an intermediate signal. Example 35 further includes selecting a different intermediate mixing carrier frequency from the plurality of intermediate mixing carrier frequencies based on the measured further signal level of the received signal at a higher frequency and the measured further signal level of the third signal at a lower frequency and mixing at least a portion of the first signal to the different intermediate carrier frequency to generate a different intermediate signal.

In Example 36, the subject matter of Example 35 can optionally include wherein the selecting a different intermediate mixing carrier frequency includes selecting a different intermediate mixing carrier frequency if the difference between the further signal level of the received signal at a higher frequency and the further signal level of the received signal at a lower frequency is greater than a predefined threshold.

In Example 37, the subject matter of Example 35 can optionally include wherein the processing the intermediate signal generates an output signal, and wherein the selecting the different intermediate carrier frequency includes selecting the different intermediate mixing carrier frequency from the plurality of intermediate mixing carrier frequencies if a signal quality of the output signal satisfies a predefined criterion.

In Example 38, the subject matter of Example 35 can optionally include wherein the measuring the further signal level of the received signal at a higher frequency and the further signal level of the received signal at a lower frequency includes measuring an average signal level of the received signal at a higher frequency and measuring an average signal level of the received signal at a lower frequency.

In Example 39, the subject matter of Example 33 can further include measuring a signal level of a second signal located in a selected frequency band, wherein the selected frequency band is identified as potentially containing spurious interference. Example 39 further includes wherein the selecting an intermediate mixing carrier frequency from a plurality of intermediate mixing carrier frequencies includes selecting one of the first intermediate carrier frequency or the second intermediate carrier frequency or a third intermediate carrier frequency as the intermediate carrier frequency, wherein the third intermediate carrier frequency is equal to the first carrier frequency.

In Example 40, the subject matter of Example 39 can optionally include wherein the selecting an intermediate mixing carrier frequency from the plurality of intermediate mixing carrier frequencies includes selecting the first intermediate mixing carrier frequency if the signal level of the received signal at a higher frequency is less than the signal level of the received signal at a lower frequency and selecting the second intermediate mixing carrier frequency if the signal level of the received signal at a higher frequency is greater than the signal level of the received signal at a lower frequency.

In Example 41, the subject matter of Example 40 can optionally include wherein the selecting an intermediate mixing carrier frequency includes selecting either the first intermediate mixing carrier frequency or the second intermediate mixing carrier frequency if the measured signal level of the second signal in the selected frequency band indicates that spurious interference is present in the selected frequency band.

In Example 42, the subject matter of Example 41 can optionally include wherein the selecting an intermediate mixing carrier frequency includes selecting the third intermediate mixing carrier frequency if the measured signal level of the second signal in the selected frequency band indicates that the selected frequency band is substantially free of spurious interference.

In Example 43, the subject matter of Example 39 can further include measuring a further signal level of the received signal at a higher frequency and measuring a further signal level of the received signal at a lower frequency. Example 43 further includes wherein the further signal levels are measured after mixing at least the portion of the first signal to the selected intermediate carrier frequency to generate an intermediate signal. Example 43 further includes selecting a different intermediate mixing carrier frequency from the plurality of intermediate mixing carrier frequencies based on the measured further signal level of the received signal at a higher frequency, the measured further signal level of the received signal at a lower frequency, and the measured further signal level of the received second signal in the selected frequency band and mixing at least a portion of the first signal to the different intermediate carrier frequency to generate a different intermediate signal.

In Example 44, the subject matter of Example 43 can optionally include wherein the selecting a different intermediate mixing carrier frequency includes selecting either the first intermediate mixing carrier frequency or the second intermediate mixing carrier frequency as the different intermediate mixing carrier frequency by comparing the measured further signal level of the received signal at a higher frequency and the measured further signal level of the received signal at a lower frequency.

In Example 45, the subject matter of Example 43 can optionally include wherein the selecting a different intermediate mixing carrier frequency includes selecting the first intermediate mixing carrier frequency as the different intermediate mixing carrier frequency if the measured further signal level of the received signal at a higher frequency is less than the measured further signal level of the received signal at a lower frequency.

In Example 46, the subject matter of Example 43 can optionally include wherein the selecting a different intermediate mixing carrier frequency includes selecting the first intermediate mixing carrier frequency as the different intermediate mixing carrier frequency if the measured further signal level of the received signal at a higher frequency is less than the measured further signal level of the received signal at a lower frequency by a predefined amount.

In Example 47, the subject matter of Example 44 can optionally include wherein selecting a different intermediate mixing carrier frequency includes selecting the second intermediate mixing carrier frequency as the different intermediate mixing carrier frequency if the measured further signal level of the received signal at a higher frequency is greater than the measured further signal level of the received signal at a lower frequency.

In Example 48, the subject matter of Example 47 can optionally include wherein selecting a different intermediate mixing carrier frequency includes selecting the second intermediate mixing carrier frequency as the different intermediate mixing carrier frequency if the measured further signal level of the received signal at a higher frequency is greater than the measured further signal level of the received signal at a lower frequency by a predefined amount.

In Example 49, the subject matter of Example 43 can optionally include wherein selecting a different intermediate mixing carrier frequency includes selecting the third intermediate mixing carrier frequency as the different intermediate mixing carrier frequency if the further signal level of the received second signal in the selected frequency band indicates that the selected frequency band is substantially free of spurious interference.

In Example 50, the subject matter of Examples 32 to 49 can further include receiving a further signal and processing at least a portion of the received further signal at the same time as the portion of the received first signal.

In Example 51, the subject matter of Examples 32 to 50 can optionally include wherein the received first signal is a first wanted signal that is modulated to the first carrier frequency for wireless transmission.

In Example 52, the subject matter of Examples 50 or 51 can optionally include wherein the received further signal is a second wanted signal that is modulated to a different carrier frequency from the first carrier frequency.

In Example 53, the subject matter of Examples 32 to 52 can optionally include wherein the selecting the selected intermediate mixing carrier frequency includes selecting the selected intermediate mixing carrier frequency such that the predefined frequency band is substantially free of spurious interference in the case that the intermediate frequency reception of at least a portion of the received first signal is performed using the selected intermediate mixing carrier frequency.

In Example 54, the subject matter of Examples 32 to 53 can optionally include wherein the measuring the signal level of the received signal at a frequency being higher than the first carrier frequency includes a received signal strength indication measurement.

In Example 55, the subject matter of Example 54 can optionally include wherein the measuring the signal level of the received signal at a higher than the first carrier frequency includes a wideband received signal strength indication measurement.

In Example 56, the subject matter of Examples 32 to 55 can optionally include wherein measuring the signal level of the received signal at a lower frequency than the first carrier frequency includes a received signal strength indication measurement.

In Example 57, the subject matter of Example 56 can optionally include wherein measuring the signal level of the received signal at a lower frequency than the first carrier frequency includes a wideband received signal strength indication measurement.

In Example 58, the subject matter of Examples 32 to 57 can optionally include wherein the first signal is processed in accordance with Universal Mobile Telecommunications System (UMTS).

In Example 59, the subject matter of Examples 32 to 58 can optionally include wherein the first signal is processed in accordance with Long Term Evolution (LTE).

In Example 60, the subject matter of Examples 32 to 59 can optionally include wherein the first signal is processed in accordance with Long Term Evolution Advanced (LTE-A).

In Example 61, the subject matter of Examples 32 to 60 can further include performing a carrier aggregation process using the received first signal.

In Example 62, the subject matter of Examples 32 to 61 can optionally include wherein the received first signal is a mobile radio signal.

Example 63 is a mobile radio communication terminal device. Example 63 includes a receiver configured to receive a first signal modulated at a first carrier frequency located in a predefined frequency band, a first circuit configured to measure a signal level of a received second signal at a higher frequency than the first carrier frequency, a second circuit configured to measure a signal level of a received third signal at a lower frequency than the first carrier frequency, a selector configured to select an intermediate mixing carrier frequency from a plurality of intermediate mixing carrier frequencies for processing at least a portion of the received first signal based on the signal level of the received second signal and the signal level of the received third signal and a third circuit configured to perform intermediate frequency reception of at least a portion of the received first signal using the selected intermediate mixing carrier frequency.

In Example 64, the subject matter of Example 63 can optionally include wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selector is configured to select the intermediate mixing carrier frequency from the plurality of intermediate mixing carrier frequencies by comparing the signal level of the received second signal and the signal level of the received third signal.

In Example 65, the subject matter of Example 64 can optionally include wherein the selector is configured to select the first intermediate mixing carrier frequency if the signal level of the received second signal is less than the signal level of the received third signal, and wherein the selector is configured to select the second intermediate mixing carrier frequency if the signal level of the received second signal is greater than the signal level of the received third signal.

In Example 66, the subject matter of Example 64 can optionally include wherein the first circuit is configured to measure a further signal level of the received second signal and wherein the second circuit is configured to measure a further signal level of the received third signal. Example 66 further includes wherein the first and second circuits are configured to measure the further signal levels after the third circuit performs intermediate frequency reception of at least a portion of the received first signal using the selected intermediate mixing carrier frequency. Example 66 further includes wherein the selector is further configured to select a different intermediate mixing carrier frequency from the plurality of intermediate mixing carrier frequencies based on the measured further signal level of the received second signal and the measured further signal level of the received third signal. Example 66 further includes wherein the third circuit is configured to perform intermediate frequency reception of at least a portion of the received first signal using the different intermediate mixing carrier frequency.

In Example 67, the subject matter of Example 66 can optionally include wherein the selector is configured to select the different intermediate mixing carrier frequency if the difference between further signal level of the received second signal and the further signal level of the received third signal is greater than a predefined threshold.

In Example 68, the subject matter of Example 66 can optionally include wherein the third circuit is further configured to generate an output signal by performing intermediate frequency reception of at least a portion of the received first signal using the selected intermediate mixing carrier frequency, and wherein the selector is configured to select the different intermediate mixing carrier frequency from the plurality of intermediate mixing carrier frequencies if a signal quality of the output signal satisfies a predefined criterion.

In Example 69, the subject matter of Example 66 can optionally include wherein the first circuit is configured to measure the further signal level of the received second signal by measuring an average signal level of the received second signal, and wherein the second circuit is configured to measure the further signal level of the received third signal by measuring an average signal level of the received third signal.

In Example 70, the subject matter of 64 can optionally include a fourth circuit configured to measure a signal level of a fourth signal located in a selected frequency band, wherein the selected frequency band is identified as potentially containing spurious interference and wherein the selector is configured to select an intermediate mixing carrier frequency from the plurality of intermediate mixing carrier frequencies by selecting one of the first intermediate mixing carrier frequency or the second intermediate mixing carrier frequency or a third intermediate mixing carrier frequency as the intermediate mixing carrier frequency, wherein the third intermediate mixing carrier frequency is equal to the first carrier frequency.

In Example 71, the subject matter of Example 70 can optionally include wherein the selector is configured to select the first intermediate mixing carrier frequency if the second signal level is less than the third signal level, and wherein the selector is configured to select the second intermediate mixing carrier frequency if the second signal level is greater than the third signal level.

In Example 72, the subject matter of Example 70 can optionally include wherein the selector is configured to select either the first intermediate mixing carrier frequency or the second intermediate mixing carrier frequency if the measured signal level of the fourth signal indicates that spurious interference is present in the selected frequency band.

In Example 73, the subject matter of Example 70 can optionally include wherein the selector is configured to select either the first intermediate mixing carrier frequency or the second intermediate mixing carrier frequency if the measured signal level of the fourth signal indicates that spurious interference is present in the selected frequency band.

In Example 74, the subject matter of Example 70 can optionally include wherein the first circuit is configured to measure a further signal level of the received second signal, wherein the second circuit is configured to measure a further signal level of the received third signal, wherein the fourth circuit is configured to measure a further signal level of the received fourth signal, wherein the first, second, and fourth circuits are configured to measure the further signal levels after the third circuit performs intermediate frequency reception of at least a portion of the received first signal using the selected intermediate mixing carrier frequency, wherein the selector is further configured to select a different intermediate mixing carrier frequency from the plurality of intermediate mixing carrier frequencies based on the measured further signal level of the received second signal, the measured further signal level of the received third signal, and the measured further signal level of the received fourth signal, and wherein the third circuit is further configured to perform intermediate frequency reception of at least a portion of the received first signal using the different intermediate mixing carrier frequency.

In Example 75, the subject matter of Example 74 can optionally include wherein the selector is configured to select either the first intermediate mixing carrier frequency or the second intermediate mixing carrier frequency as the different intermediate mixing carrier frequency by comparing the measured further signal level of the received second signal and the measured further signal level of the received third signal.

In Example 76, the subject matter of Example 75 can optionally include wherein the selector is configured to select the first intermediate mixing carrier frequency as the different intermediate mixing carrier frequency if the measured further signal level of the received second signal is less than the measured further signal level of the received third signal.

In Example 77, the subject matter of Example 76 can optionally include wherein the selector is configured to select the first intermediate mixing carrier frequency as the different intermediate mixing carrier frequency if the measured further signal level of the received second signal is less than the measured further signal level of the received third signal by a predefined amount.

In Example 78, the subject matter of Example 75 can optionally include wherein the selector is configured to select the second intermediate mixing carrier frequency as the different intermediate mixing carrier frequency if the measured further signal level of the received second signal is greater than the measured further signal level of the received third signal.

In Example 79, the subject matter of Example 78 can optionally include wherein the selector is configured to select the second intermediate mixing carrier frequency as the different intermediate mixing carrier frequency if the measured further signal level of the received second signal is greater than the measured further signal level of the received third signal by a predefined amount.

In Example 80, the subject matter of Example 74 can optionally include wherein the selector is configured to select the third intermediate mixing carrier frequency as the different intermediate mixing carrier frequency in the case that the further signal level of the received fourth signal indicates that the selected frequency band is substantially free of spurious interference.

In Example 81, the subject matter of Examples 63 to 80 can optionally include a fifth circuit configured to process at least a portion of a received fifth signal at the same time as the portion of the received first signal.

In Example 82, the subject matter of Examples 63 to 81 can optionally include wherein the received first signal is a first wanted signal that is modulated to the first carrier frequency for wireless transmission.

In Example 83, the subject matter of Examples 81 or 82 can optionally include wherein the received first signal is a first wanted signal that is modulated to the first carrier frequency for wireless transmission.

In Example 84, the subject matter of Examples 63 to 83 can optionally include wherein the selector is configured to select the intermediate mixing carrier frequency such that no spur interference signal is generated in the predefined frequency band if the intermediate frequency reception of at least a portion of the received first signal is performed using the selected intermediate mixing carrier frequency.

In Example 85, the subject matter of Examples 63 to 84 can optionally include wherein the first circuit is configured to measure the signal level of the received second signal by measuring a received signal strength indication.

In Example 86, the subject matter of Example 85 can optionally include wherein the first circuit is configured to measure the signal level of the received second signal by measuring a wideband received signal strength indication.

In Example 87, the subject matter of Examples 63 to 86 can optionally include wherein the second circuit is configured to measure the signal level of the received third signal by measuring a received signal strength indication.

In Example 88, the subject matter of Examples 87 can optionally include wherein the second circuit is configured to measure the signal level of the received third signal by measuring a wideband received signal strength indication.

In Example 89, the subject matter of Examples 63 to 88 can optionally be configured to process the first signal in accordance with Universal Mobile Telecommunications System (UMTS).

In Example 90, the subject matter of Examples 63 to 89 can optionally be configured to process the first signal in accordance with Long Term Evolution (LTE).

In Example 91, the subject matter of Examples 63 to 90 can optionally be configured to process the first signal in accordance with Long Term Evolution Advanced (LTE-A).

In Example 92, the subject matter of Examples 63 to 91 can optionally include wherein a carrier aggregation process is performed using the received first signal.

In Example 93, the subject matter of Examples 63 to 92 can optionally include wherein the received first signal is a mobile radio signal.

Example 94 is a mobile radio communication terminal device for processing a received first signal at a first carrier frequency located in a predefined frequency band. Example 94 further includes a first circuit configured to measure a signal level of a received signal at a higher frequency than the first carrier frequency, a second circuit configured to measure a signal level of a received signal at a lower frequency than the first carrier frequency, a selector configured to select an intermediate mixing carrier frequency from a plurality of intermediate mixing carrier frequencies for processing at least a portion of the received first signal based on the measured signal levels, a mixer configured to mix at least a portion of the first signal to the selected intermediate carrier frequency to generate an intermediate signal, and a first processor configured to process the intermediate signal.

In Example 95, the subject matter of Example 94 can optionally include wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selector is configured to select the intermediate mixing carrier frequency from the plurality of intermediate mixing carrier frequencies by comparing the signal level of the received signal at a higher frequency than the first carrier frequency and the signal level of the received signal at a lower frequency than the first carrier frequency.

In Example 96, the subject matter of Example 95 can optionally include wherein the selector is configured to wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selector is configured to select the intermediate mixing carrier frequency from the plurality of intermediate mixing carrier frequencies by comparing the signal level of the received signal at a higher frequency than the first carrier frequency and the signal level of the received signal at a lower frequency than the first carrier frequency.

In Example 97, the subject matter of Example 95 can optionally include wherein the first circuit is further configured to measure a further signal level of the received signal at a higher frequency, wherein the second circuit is further configured to measure a further signal level of the received signal at a lower frequency, wherein the further signal levels are measured after the mixer has mixed at least a portion of the first signal to the selected intermediate carrier frequency to generate an intermediate signal, wherein the selector is further configured to select a different intermediate mixing carrier frequency from the plurality of intermediate mixing carrier frequencies based on the measured further signal level of the received signal at a higher frequency and the measured further signal level of the received signal at a lower frequency, and wherein the mixer is further configured mix at least a portion of the received first signal to the different intermediate mixing carrier frequency to generate a different intermediate signal.

In Example 98, the subject matter of Example 97 can optionally include wherein the selector is configured to select the different intermediate mixing carrier frequency from the plurality of intermediate mixing carrier frequencies if the difference between the further signal level of the received signal at a higher frequency and the further signal level of the received signal being at a lower frequency is greater than a predefined threshold.

In Example 99, the subject matter of Example 97 can optionally include wherein the first processor generates an output signal by processing the intermediate signal, and wherein the selector is configured to select the different intermediate mixing carrier frequency from the plurality of intermediate mixing carrier frequencies if a signal quality of the output signal satisfies a predefined criterion.

In Example 100, the subject matter of Example 97 can optionally include wherein the first circuit is configured to measure the further signal level of the received signal at a higher frequency by measuring an average signal level of the received signal at a higher frequency, and wherein the second circuit is configured to measure the further signal level of the received signal at a lower frequency by measuring an average signal level of the received signal at a lower frequency.

In Example 101, the subject matter of Example 95 can optionally include a third circuit configured to measure a signal level of a second signal located in a selected frequency band, wherein the selected frequency band is identified as potentially containing spurious interference. Example 101 may further include wherein the selector is configured to select one of the first intermediate carrier frequency or the second intermediate carrier frequency or a third intermediate carrier frequency as the intermediate carrier frequency, wherein the third intermediate carrier frequency is equal to the first carrier frequency.

In Example 102, the subject matter of Example 101 can optionally include wherein the selector is configured to select the first intermediate mixing carrier frequency if the signal level of the received signal at a higher frequency is less than the signal level of the received signal at a lower frequency, and wherein the selector is configured to select the second intermediate mixing carrier frequency if the signal level of the received signal at a higher frequency is greater than the signal level of the received signal at a lower frequency.

In Example 103, the subject matter of Example 101 can optionally include wherein the selector is configured to select either the first intermediate mixing carrier frequency or the second intermediate mixing carrier frequency if the measured signal level of the second signal located in the selected frequency band indicates that spurious interference is present in the selected frequency band.

In Example 104, the subject matter of Example 101 can optionally include wherein selector is configured to select the third intermediate mixing carrier frequency if the measured signal level indicates that the selected frequency band is substantially free of spurious interference.

In Example 105, the subject matter of Example 95 can optionally include wherein the first circuit is configured to measure a further signal level of the received signal at a higher frequency, wherein the second circuit is configured to measure a further signal level of the received signal at a lower frequency, wherein the third circuit is configured to measure a further signal level of the second signal located in the selected frequency band, wherein the further signal levels are measured after the first processor processes the intermediate signal, wherein the selector is configured to select a different intermediate mixing carrier frequency from the plurality of intermediate mixing carrier frequencies based on the measured further signal level of the received signal at a higher frequency, the measured further signal level of the received signal at a lower frequency, and the measured further signal level of the second signal located in the selected frequency band, and wherein the mixer is configured to mix at least a portion of the first signal to the different intermediate carrier frequency to generate a different intermediate signal.

In Example 106, the subject matter of Example 105 can optionally include wherein the selector is configured to select either the first intermediate mixing carrier frequency or the second intermediate mixing carrier frequency as the different intermediate mixing carrier frequency by comparing the measured further signal level of the received signal at a higher frequency and the measured further signal level of the received signal at a lower frequency.

In Example 107, the subject matter of Example 106 can optionally include wherein the selector is configured to select the first intermediate mixing carrier frequency as the different intermediate mixing carrier frequency if the measured further signal level of the received signal at a higher frequency is less than the measured further signal level of the received signal at a lower frequency.

In Example 108, the subject matter of Example 107 can optionally include wherein the selector is configured to select the first intermediate mixing carrier frequency as the different intermediate mixing carrier frequency if the measured further signal level of the received signal at a higher frequency is less than the measured further signal level of the received signal at a lower frequency by a predefined amount.

In Example 109, the subject matter of Example 107 can optionally include wherein the selector is configured to select the second intermediate mixing carrier frequency as the different intermediate mixing carrier frequency if the measured further signal level of the received signal at a higher frequency is greater than the measured further signal level of the received signal at a lower frequency.

In Example 110, the subject matter of Example 109 can optionally include wherein the selector is configured to select the second intermediate mixing carrier frequency as the different intermediate mixing carrier frequency if the measured further signal level of the received signal at a higher frequency is greater than the measured further signal level of the received signal at a lower frequency by a predefined amount.

In Example 111, the subject matter of Example 105 can optionally include wherein the selector is configured to select the third intermediate mixing carrier frequency as the different intermediate mixing carrier frequency if the further signal level of the second signal located in the selected frequency band indicates that the selected frequency band is substantially free of spurious interference.

In Example 112, the subject matter of Examples 94 to 111 can optionally include a second processor configured to process at least a portion of a received further signal at the same time as the portion of the received first signal.

In Example 113, the subject matter of Examples 94 to 112 can optionally include wherein the received first signal is a first wanted signal that is modulated to the first carrier frequency for wireless transmission.

In Example 114, the subject matter of Examples 112 or 113 can optionally include wherein the received further signal is a second wanted signal that is modulated to a different carrier frequency from the first carrier frequency.

In Example 115, the subject matter of Examples 94 to 114 can optionally include wherein the selector is further configured to select the intermediate mixing carrier frequency such that no spur interference signal is generated in the predefined frequency band if the intermediate signal is processed using the selected intermediate mixing carrier frequency.

In Example 116, the subject matter of Examples 94 to 115 can optionally include wherein the first circuit is configured to measure the signal level of the received signal at a higher frequency than the first carrier frequency by measuring a received signal strength indication.

In Example 117, the subject matter of Example 116 can optionally include wherein the first circuit is configured to measure the signal level of the received signal at a higher frequency than the first carrier frequency by measuring a wideband received signal strength indication.

In Example 118, the subject matter of Examples 94 to 117 can optionally include wherein the second circuit is configured to measure the signal level of the received signal at a lower frequency than the first carrier frequency by measuring a received signal strength indication.

In Example 119, the subject matter of Examples 94 to 118 can optionally include wherein the second circuit is configured to measure the signal level of the received signal at a lower frequency than the first carrier frequency by measuring a wideband received signal strength indication.

In Example 120, the subject matter of Examples 94 to 119 can optionally be further configured to process the first signal in accordance with Universal Mobile Telecommunications System (UMTS).

In Example 121, the subject matter of Examples 94 to 120 can optionally be further configured to process the first signal in accordance with Long Term Evolution (LTE).

In Example 122, the subject matter of Examples 94 to 121 can optionally be further configured to process the first signal in accordance with Long Term Evolution Advanced (LTE-A).

In Example 123, the subject matter of Examples 94 to 122 can optionally include wherein a carrier aggregation process is performed using the received first signal.

In Example 124, the subject matter of Examples 94 to 123 can optionally include wherein the received first signal is a mobile radio signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of processing signals, the method comprising:
receiving a first signal at a first carrier frequency located in a predefined frequency band;
measuring a signal level of a received second signal at a higher frequency than the first carrier frequency;
measuring a signal level of a received third signal at a lower frequency than the first carrier frequency;
selecting an intermediate mixing carrier frequency from a plurality of intermediate mixing carrier frequencies for processing at least a portion of the received first signal based on the signal level of the received second signal and the signal level of the received third signal; and
performing intermediate frequency reception of at least a portion of the received first signal using the selected intermediate mixing carrier frequency.

2. The method of claim 1, wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the intermediate mixing carrier frequency is selected from the plurality of intermediate mixing carrier frequencies by comparing the signal level of the received second signal and the signal level of the received third signal.

3. The method of claim 2, further comprising:
measuring a signal level of a received fourth signal located in a selected frequency band, wherein the selected frequency band is identified as potentially containing spurious interference,
wherein the selecting an intermediate mixing carrier frequency from the plurality of intermediate mixing carrier frequencies comprises selecting one of the first intermediate mixing carrier frequency or the second intermediate mixing carrier frequency or a third intermediate mixing carrier frequency as the intermediate mixing carrier frequency, wherein the third intermediate mixing carrier frequency is equal to the first carrier frequency.

4. The method of claim 3, further comprising:
measuring a further signal level of the received second signal;
measuring a further signal level of the received third signal;
measuring a further signal level of the received fourth signal,
wherein the further signal levels are measured after performing intermediate frequency reception of at least a portion of the received first signal using the selected intermediate mixing carrier frequency;
selecting a different intermediate mixing carrier frequency from the plurality of intermediate mixing carrier frequencies based on the measured further signal level of the received second signal, the measured further signal level of the received third signal, and the measured further signal level of the received fourth signal; and
performing intermediate frequency reception of at least a portion of the received first signal using the different intermediate mixing carrier frequency.

5. The method of claim 1, further comprising:
measuring a further signal level of the received second signal;
measuring a further signal level of the received third signal,
wherein the further signal levels are measured after performing intermediate frequency reception of at least a portion of the received first signal using the selected intermediate mixing carrier frequency;
selecting a different intermediate mixing carrier frequency from the plurality of intermediate mixing carrier frequencies based on the measured further signal level of the received second signal and the measured further signal level of the received third signal; and
performing intermediate frequency reception of at least a portion of the received first signal using the different intermediate mixing carrier frequency.

6. A mobile radio communication terminal device, comprising:
a receiver configured to receive a first signal modulated at a first carrier frequency located in a predefined frequency band;
a first circuit configured to measure a signal level of a received second signal at a higher frequency than the first carrier frequency;
a second circuit configured to measure a signal level of a received third signal at a lower frequency than the first carrier frequency;
a selector configured to select an intermediate mixing carrier frequency from a plurality of intermediate mixing carrier frequencies for processing at least a portion of the received first signal based on the signal level of the received second signal and the signal level of the received third signal; and
a third circuit configured to perform intermediate frequency reception of at least a portion of the received first signal using the selected intermediate mixing carrier frequency.

7. The mobile radio communication terminal device of claim 6, wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selector is configured to select the intermediate mixing carrier frequency from the plurality of intermediate mixing carrier frequencies by comparing the signal level of the received second signal and the signal level of the received third signal.

8. The mobile radio communication terminal device of claim 7, wherein the selector is configured to select the first intermediate mixing carrier frequency if the signal level of the received second signal is less than the signal level of the received third signal, and wherein the selector is configured to select the second intermediate mixing carrier frequency if the signal level of the received second signal is greater than the signal level of the received third signal.

9. The mobile radio communication terminal device of claim 7, further comprising:
a fourth circuit configured to measure a signal level of a received fourth signal located in a selected frequency band, wherein the selected frequency band is identified as potentially containing spurious interference; and
wherein the selector is configured to select an intermediate mixing carrier frequency from the plurality of intermediate mixing carrier frequencies by selecting one of the first intermediate mixing carrier frequency or the second intermediate mixing carrier frequency or a third intermediate mixing carrier frequency as the intermediate mixing carrier frequency, wherein the third intermediate mixing carrier frequency is equal to the first carrier frequency.

10. The mobile radio communication terminal device of claim 9, wherein the selector is configured to select either the first intermediate mixing carrier frequency or the second intermediate mixing carrier frequency if the measured signal level of the received fourth signal indicates that spurious interference is present in the selected frequency band.

11. The mobile radio communication terminal device of claim 9, wherein the selector is configured to select the third intermediate mixing carrier frequency if the measured signal level of the received fourth signal indicates that the selected frequency band is substantially free of spurious interference.

12. The mobile radio communication terminal device of claim 6, further comprising:
a fifth circuit configured to process at least a portion of a received fifth signal at the same time as the portion of the received first signal.

13. The mobile radio communication terminal device of claim 6, wherein the selector is configured to select the intermediate mixing carrier frequency such that no spur interference signal is generated in the predefined frequency band if the intermediate frequency reception of at least a portion of the received first signal is performed using the selected intermediate mixing carrier frequency.

14. A mobile radio communication terminal device for processing a received first signal at a first carrier frequency located in a predefined frequency band, the mobile radio communication terminal device comprising:

a first circuit configured to measure a signal level of the received first signal at a higher frequency than the first carrier frequency;

a second circuit configured to measure a signal level of the received first signal at a lower frequency than the first carrier frequency;

a selector configured to select an intermediate mixing carrier frequency from a plurality of intermediate mixing carrier frequencies for processing at least a portion of the received first signal based on the measured signal levels of the received first signal;

a mixer configured to mix at least a portion of the received first signal to the selected intermediate carrier frequency to generate an intermediate signal; and a first processor configured to process the intermediate signal.

15. The mobile radio communication terminal device of claim 14, wherein a first intermediate mixing carrier frequency of the plurality of intermediate mixing carrier frequencies is above the predefined frequency band and wherein a second intermediate mixing carrier frequency of the plurality of intermediate mixing carrier frequencies is below the predefined frequency band, and wherein the selector is configured to select the intermediate mixing carrier frequency from the plurality of intermediate mixing carrier frequencies by comparing the signal level of the received first signal at the higher frequency than the first carrier frequency and the signal level of the received first signal at the lower frequency than the first carrier frequency.

16. The mobile radio communication terminal device of claim 15, wherein the selector is configured to select the first intermediate mixing carrier frequency if the signal level of the received first signal at the higher frequency than the first carrier frequency is less than the signal level of the received first signal at the lower frequency than the first carrier frequency, and wherein the selector is configured to select the second intermediate mixing carrier frequency if the signal level of the received first signal at the higher frequency than the first carrier frequency is greater than the signal level of the received first signal at the lower frequency than the first carrier frequency.

17. The mobile radio communication terminal device of claim 15, further comprising:

a third circuit configured to measure a signal level of a received second signal located in a selected frequency band, wherein the selected frequency band is identified as potentially containing spurious interference;

wherein the selector is configured to select one of the first intermediate mixing carrier frequency or the second intermediate mixing carrier frequency or a third intermediate mixing carrier frequency as the mixing intermediate carrier frequency, wherein the third intermediate mixing carrier frequency is equal to the first carrier frequency.

18. The mobile radio communication terminal device of claim 14, further comprising:

a second processor configured to process at least a portion of a received further signal at the same time as the portion of the received first signal.

19. The mobile radio communication terminal device of claim 18, wherein the received first signal is a first wanted signal that is modulated to the first carrier frequency for wireless transmission.

20. The mobile radio communication terminal device of claim 19, wherein the received further signal is a second wanted signal that is modulated to a different carrier frequency from the first carrier frequency.

* * * * *